(12) United States Patent
Dubey et al.

(10) Patent No.: US 12,072,915 B2
(45) Date of Patent: Aug. 27, 2024

(54) METHOD AND SYSTEM FOR PROVIDING PROFILE BASED DATA ACCESS THROUGH SEMANTIC DOMAIN LAYER

(71) Applicant: HCL Technologies Limited, New Delhi (IN)

(72) Inventors: Himanshu Dubey, Noida (IN); Prathameshwar Pratap Singh, Noida (IN); Yogesh Gupta, Noida (IN)

(73) Assignee: HCL Technologies Limited, New Delhi (IN)

( * ) Notice: Subject to any disclaimer, the term of this patent is extended or adjusted under 35 U.S.C. 154(b) by 157 days.

(21) Appl. No.: 17/682,059

(22) Filed: Feb. 28, 2022

(65) Prior Publication Data
US 2022/0391419 A1 Dec. 8, 2022

(30) Foreign Application Priority Data
Mar. 12, 2021 (IN) .............................. 202111010599

(51) Int. Cl.
*G06F 16/28* (2019.01)
*G06F 16/22* (2019.01)
*G06F 21/60* (2013.01)
*G06F 21/62* (2013.01)
*G06F 40/30* (2020.01)

(52) U.S. Cl.
CPC ........ *G06F 16/287* (2019.01); *G06F 16/2282* (2019.01); *G06F 21/602* (2013.01); *G06F 21/6218* (2013.01); *G06F 40/30* (2020.01)

(58) Field of Classification Search
None
See application file for complete search history.

(56) References Cited

U.S. PATENT DOCUMENTS

| 6,996,566 B1 | 2/2006 | George et al. |
| 8,230,343 B2 | 7/2012 | Logan et al. |
| 8,245,186 B2 | 8/2012 | Gryko et al. |

(Continued)

FOREIGN PATENT DOCUMENTS

WO 2004075466 A2 9/2004

OTHER PUBLICATIONS

Systems and methods for semantic reasoning, U.S. Appl. No. 61/846,118, filed Jul. 15, 2013.

(Continued)

*Primary Examiner* — Kim T Nguyen
(74) *Attorney, Agent, or Firm* — Kendal M. Sheets

(57) ABSTRACT

A method and system for providing profile-based data and visualization access through a semantic domain layer is disclosed. In some embodiments, the method includes receiving a user request to access data. The method further includes determining a user profile from a plurality of user profiles associated with the user. The method further includes extracting a first access level from a first set of access levels associated with the user profile. The method further includes mapping the user profile with a domain object from a plurality of domain objects, based on a second access level from the first set of access levels associated with the domain object. The method further includes selectively rendering at least a portion of the data requested in the user request to the user, in response to mapping the user profile with the domain object.

21 Claims, 17 Drawing Sheets

(56) References Cited

U.S. PATENT DOCUMENTS

| | | |
|---|---|---|
| 8,321,836 B2 | 11/2012 | Meijer et al. |
| 8,332,337 B2 | 12/2012 | Harrison et al. |
| 8,396,804 B1 | 3/2013 | Dala et al. |
| 8,468,391 B2 | 6/2013 | Balani et al. |
| 8,656,343 B2 | 2/2014 | Fox et al. |
| 8,756,185 B2 | 6/2014 | Dawson et al. |
| 8,918,739 B2 | 12/2014 | Butin et al. |
| 8,983,900 B2 | 3/2015 | Hegde et al. |
| 9,135,151 B2 | 9/2015 | Betak et al. |
| 9,207,931 B2 | 12/2015 | Fox et al. |
| 9,424,167 B2 | 8/2016 | Lee et al. |
| 9,489,630 B2 | 11/2016 | Achin et al. |
| 9,519,477 B2 | 12/2016 | Champlin-Scharff et al. |
| 9,602,738 B2 | 3/2017 | Choe et al. |
| 9,652,846 B1 | 5/2017 | Codella et al. |
| 9,665,467 B2 | 5/2017 | Angwin et al. |
| 9,710,767 B1 | 7/2017 | Dietrich et al. |
| 9,740,462 B2 | 8/2017 | Rao et al. |
| 9,779,492 B1 | 10/2017 | Garnavi et al. |
| 9,898,387 B2 | 2/2018 | Rodmell |
| 9,928,160 B2 | 3/2018 | Champlin-Scharff et al. |
| 10,466,978 B1 | 11/2019 | Vidan et al. |
| 10,614,382 B1 | 4/2020 | Wu |
| 11,763,371 B2 * | 9/2023 | Rackley, III ............ G06N 20/00 |
| 2002/0156799 A1 | 10/2002 | Markel et al. |
| 2007/0074167 A1 | 3/2007 | Cohrs et al. |
| 2007/0112574 A1 | 5/2007 | Greene |
| 2007/0239769 A1 | 10/2007 | Fazal et al. |
| 2007/0274563 A1 | 11/2007 | Jung et al. |
| 2008/0320444 A1 | 12/2008 | Meijer et al. |
| 2009/0030902 A1 | 1/2009 | Aharoni et al. |
| 2009/0089078 A1 | 4/2009 | Bursey |
| 2009/0172047 A1 | 7/2009 | Boyko et al. |
| 2009/0181665 A1 | 7/2009 | Sater et al. |
| 2010/0114806 A1 | 5/2010 | Harrison et al. |
| 2010/0153382 A1 | 6/2010 | Vidov et al. |
| 2011/0214064 A1* | 9/2011 | Schneider ............ G06F 21/6218 |
| | | 715/744 |
| 2011/0276354 A1 | 11/2011 | Bijani et al. |
| 2011/0313969 A1 | 12/2011 | Ramu |
| 2012/0290412 A1 | 11/2012 | Marovets |
| 2013/0007700 A1 | 1/2013 | Villar et al. |
| 2013/0066717 A1 | 3/2013 | Marovets |
| 2013/0095864 A1 | 4/2013 | Marovets |
| 2013/0191185 A1 | 7/2013 | Galvin |
| 2013/0212562 A1 | 8/2013 | Fox et al. |
| 2013/0339311 A1 | 12/2013 | Ferrari et al. |
| 2014/0115562 A1 | 4/2014 | Fox et al. |
| 2014/0122697 A1 | 5/2014 | Liu et al. |
| 2014/0164507 A1 | 6/2014 | Tesch et al. |
| 2014/0172490 A1 | 6/2014 | Snyder |
| 2014/0282400 A1 | 9/2014 | Moorthi et al. |
| 2014/0330578 A1 | 11/2014 | Pincus |
| 2015/0082277 A1 | 3/2015 | Champlin-Scharff et al. |
| 2015/0213793 A1 | 7/2015 | Phelan et al. |
| 2015/0269060 A1 | 9/2015 | Rodmell |
| 2015/0281295 A1 | 10/2015 | Tong et al. |
| 2015/0379554 A1 | 12/2015 | Copeland |
| 2016/0132608 A1* | 5/2016 | Rathod .................. H04W 4/21 |
| | | 707/722 |
| 2016/0170742 A1 | 6/2016 | Pallath et al. |
| 2016/0255139 A1* | 9/2016 | Rathod .............. H04N 1/32101 |
| | | 709/203 |
| 2017/0004065 A1 | 1/2017 | Angwin et al. |
| 2017/0006135 A1 | 1/2017 | Siebel et al. |
| 2017/0083428 A1 | 3/2017 | Champlin-Scharff et al. |
| 2017/0109136 A1 | 4/2017 | Colle et al. |
| 2017/0124487 A1 | 5/2017 | Szeto et al. |
| 2017/0132817 A1 | 5/2017 | Mahajan et al. |
| 2017/0185904 A1 | 6/2017 | Padmanabhan et al. |
| 2017/0199930 A1* | 7/2017 | Trabelsi ............... G06F 16/3347 |
| 2017/0206064 A1 | 7/2017 | Breazeal et al. |
| 2017/0213132 A1 | 7/2017 | Hammond et al. |
| 2017/0213154 A1 | 7/2017 | Hammond et al. |
| 2017/0330205 A1 | 11/2017 | Belanger et al. |
| 2017/0357568 A1 | 12/2017 | Hughes et al. |
| 2018/0052898 A1 | 2/2018 | Allan et al. |
| 2018/0067732 A1 | 3/2018 | Seetharaman et al. |
| 2018/0068271 A1 | 3/2018 | Abebe et al. |
| 2018/0089572 A1 | 3/2018 | Aili et al. |
| 2018/0101465 A1 | 4/2018 | Keinan |
| 2018/0107583 A1 | 4/2018 | Champlin-Scharff et al. |
| 2022/0391419 A1* | 12/2022 | Dubey ................ G06F 16/2282 |
| 2023/0352132 A1* | 11/2023 | Gold ..................... G06F 40/30 |

OTHER PUBLICATIONS

Dave Mariani, What is a Universal Semantic Layer? Why Would You Want One?, Blog / Analytics & Strategy, Nov. 29, 2021, atscale.com.

* cited by examiner

METHOD AND SYSTEM FOR PROVIDING PROFILE BASED DATA ACCESS THROUGH SEMANTIC DOMAIN LAYER

TECHNICAL FIELD

Generally, the invention relates to providing profile based data access to users. More specifically, the invention relates to method and system for providing profile-based data access through a semantic domain layer.

BACKGROUND

Most of data visualization and reporting tools available nowadays, have capabilities to create and configure data connections, query, join, and filter. These existing tools provide assistance to load and visualize data from different data sets. Moreover, in order to create data sets via these tools, there is a need to take help from an Information Technology (IT) team (or data engineer) to identify right data sources, tables (tables, fields, joins) and data definitions. Once the data sources are identified, then using these existing tools, final datasets are created. Further, the final datasets created, that are available within the existing tools are used for data visualization and querying activities. Based on the final datasets created, all business users (or end user) creates reports and dashboard as per their requirements.

However, there are certain limitations and complications in the existing tools that are used for data visualization and querying activities. The limitations in the existing tools includes strong dependency to identify and create final datasets before the final datasets can be used for reporting and data visualization purpose. Additionally, the final datasets created using these existing tools are available and limited within these tools only and can be consumed internally (i.e., within the tools itself). In other words, the final datasets created are not visible outside to get consumed by external applications.

Further, during creation of the final dataset, permissions for row level and column level for a user are static. In addition, these permissions have to be defined for the user while creating the final datasets. Moreover, user level permissions and access need to get defined at user, role, and group level. This in turn provides limited capabilities for dynamic user persona detection and available control. Since, user views, filter conditions, and access levels need to get defined at user, role, and group level, these existing tools provides less integration and reusability capabilities of the final datasets created and data definitions.

Also, the existing tools provides limited self-service approach to business users for creating visualization, reports, and dashboards, as there is a need of separate report layer to access data sets and create reports. Moreover, the existing tools are untrustworthy and don't have a single source of truth as data sources are available without masking and encryption. Due to above listed limitations, these existing tools cannot bring self-service approach to create visualization on top of data, due to dependency on IT teams or data engineers, and static behavior.

Therefore, there is a need of an efficient and reliable method and system providing profile-based data and visualization access through a semantic domain layer.

SUMMARY OF INVENTION

In one embodiment, a method for providing profile-based data and visualization access through a semantic domain layer is disclosed. The method may include receiving a user request to access data. The method may include determining a user profile from a plurality of user profiles associated with the user. It should be noted that, the plurality of user profiles corresponds to a plurality of users. The method may include extracting a first access level from a first set of access levels associated with the user profile. The method may include mapping the user profile with a domain object from a plurality of domain objects, based on a second access level from the first set of access levels associated with the domain object. The method may include selectively rendering at least a portion of the data requested in the user request to the user, in response to mapping the user profile with the domain object.

In another embodiment, a system for providing profile-based data and visualization access through a semantic domain layer is disclosed. The system includes a processor and a memory communicatively coupled to the processor. The memory may store processor-executable instructions, which, on execution, may causes the processor to receive a user request to access data. It should be noted that, the plurality of user profiles corresponds to a plurality of users. The processor-executable instructions, on execution, may further cause the processor to determine a user profile from a plurality of user profiles associated with the user. The processor-executable instructions, on execution, may further cause the processor to extract a first access level from a first set of access levels associated with the user profile. The processor-executable instructions, on execution, may further cause the processor to map the user profile with a domain object from a plurality of domain objects, based on a second access level from the first set of access levels associated with the domain object. The processor-executable instructions, on execution, may further cause the processor to selectively render at least a portion of the data requested in the user request to the user, in response to mapping the user profile with the domain object.

In yet another embodiment, a non-transitory computer-readable medium storing computer-executable instruction for providing profile-based data and visualization access through a semantic domain layer is disclosed. The stored instructions, when executed by a processor, may cause the processor to perform operations including receiving a user request to access data. The operations may further include determining a user profile from a plurality of user profiles associated with the user. It should be noted that, the plurality of user profiles corresponds to a plurality of users. The operations may further include extracting a first access level from a first set of access levels associated with the user profile. The operations may further include extracting a first access level from a first set of access levels associated with the user profile. The operations may further include mapping the user profile with a domain object from a plurality of domain objects, based on a second access level from the first set of access levels associated with the domain object. The operations may further include selectively rendering at least a portion of the data requested in the user request to the user, in response to mapping the user profile with the domain object.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
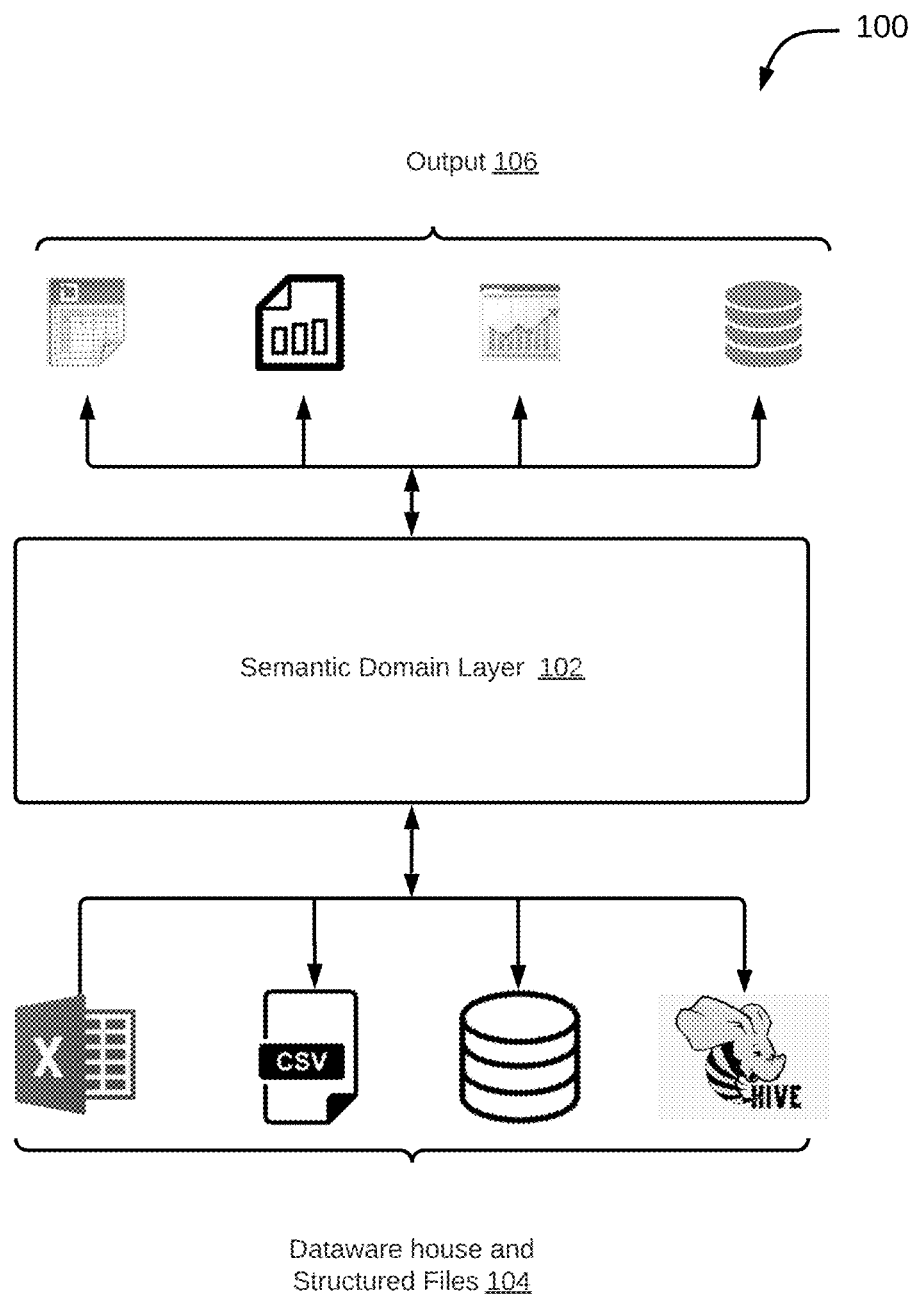
FIG. 1 illustrates a diagram of a system for providing profile-based data access through a semantic domain layer, in accordance with an embodiment.

A system 100 for providing profile based data access through a semantic domain layer 102, is illustrated in FIG. 1. In an embodiment, the semantic domain layer 102 may also be referred to as a self-service semantic domain layer. The semantic domain layer 102 may facilitate profile based access permission along with masking, encryption of data, object control, and schema control. In addition, the semantic domain layer 102 may be externally accessible from other applications to integrate and load data. Moreover, the semantic domain layer 102 may auto generate query, joins, and views with minimal knowledge of data and structure. In order to facilitate profile based data access, the semantic domain layer 102 may include a set of components. The set of components may include a Semantic Domain Layer (SDL) user interface, an SDL query engine, and at least one of a Joint Database Connectivity (JDBC) and an Open Database Connectivity (ODBC). This is further explained in detail in conjunction to FIG. 2.

In particular, in order to provide profile based data access to a user, initially, the semantic domain layer 102 may create a plurality of user profiles. The plurality of user profiles created may correspond to a plurality of users. In an embodiment, each of the plurality of user profiles may also be referred as a user persona. Moreover, each of the plurality of user profiles may be created by an administrator of the semantic domain layer 102. In an embodiment, the administrator may correspond to a person that may have access of all functionalities of the semantic domain layer 102. In other words, the administrator may be referred to as the person that may be responsible to create new user profiles, create new domain objects, provide access level and access permission to other users working in an organization. Examples of the administrator may include, but are not limited to, owner of an organization, head of a department, or a manager, etc.

Further, each of the plurality of user profiles created may be associated with at least one of a plurality of user attributes. The plurality of user attributes may include, but are not limited to at least one of employee Identifier (ID), organization ID, team ID, business unit ID, user location, current designation, department, user type, or access levels. Thereafter, the administrator may assign a first access level from a first set of access levels to each of the plurality of user profiles via the semantic domain layer 102. In an embodiment, the first access level may be assigned to verify a user requesting data access. In order to verify the user, the semantic domain layer 102 may validate whether, the user requesting the access of data belongs to the plurality of user profiles created or not. In addition, the first set of access levels may include a public access level, a private access level, and a protected access level.

Once the user profile is created, the administrator may create a plurality of domain objects utilizing the semantic domain layer 102. In order create the plurality of domain object, at least one data source may be selected from a plurality of data warehouse and structured files 104. Examples of the at least one data source may include, but are not limited to any type of databases, flat files, and web services. A method of creating each of the plurality of domain objects is explained in detail in conjunction with FIG. 5. Once the plurality of domain objects are created, the administrator may assign a second access level from the first set of access levels to each of the plurality of domain objects via the semantic domain layer 102.

Further, the semantic domain layer 102 may receive a user request to access data. Upon receiving the user request, the semantic domain layer 102 may provide access of the requested data based on mapping of the user profile with a domain object from the plurality of domain objects. In an embodiment, the mapping of the user profile with the domain object may be done only when the user profile of the user requesting the access of data corresponds to one of the plurality of user profiles created. Thereafter, at least a portion of the data requested by the user in the user request may be rendered to the user as an output 106. The portion of requested data may be rendered to the user in one of a predefined set of data visualization formats. The predefined set of data visualization formats may include, but are not limited to, charts, graphs, tables, reports, and diagrams.

In an embodiment, the system 100 developed with the semantic domain layer 102 may be referred to as a semantic domain layer web application. Moreover, the semantic domain layer 102 disclosed may be platform agnostic. This means that the disclosed sematic domain layer 102 may be integrated with any external platforms. In addition, the integration of the semantic domain layer 102 may be done without having to worry about exposing sensitive data and usage of unnecessary filtration conditions while querying data from various data sources.

Figure 2:
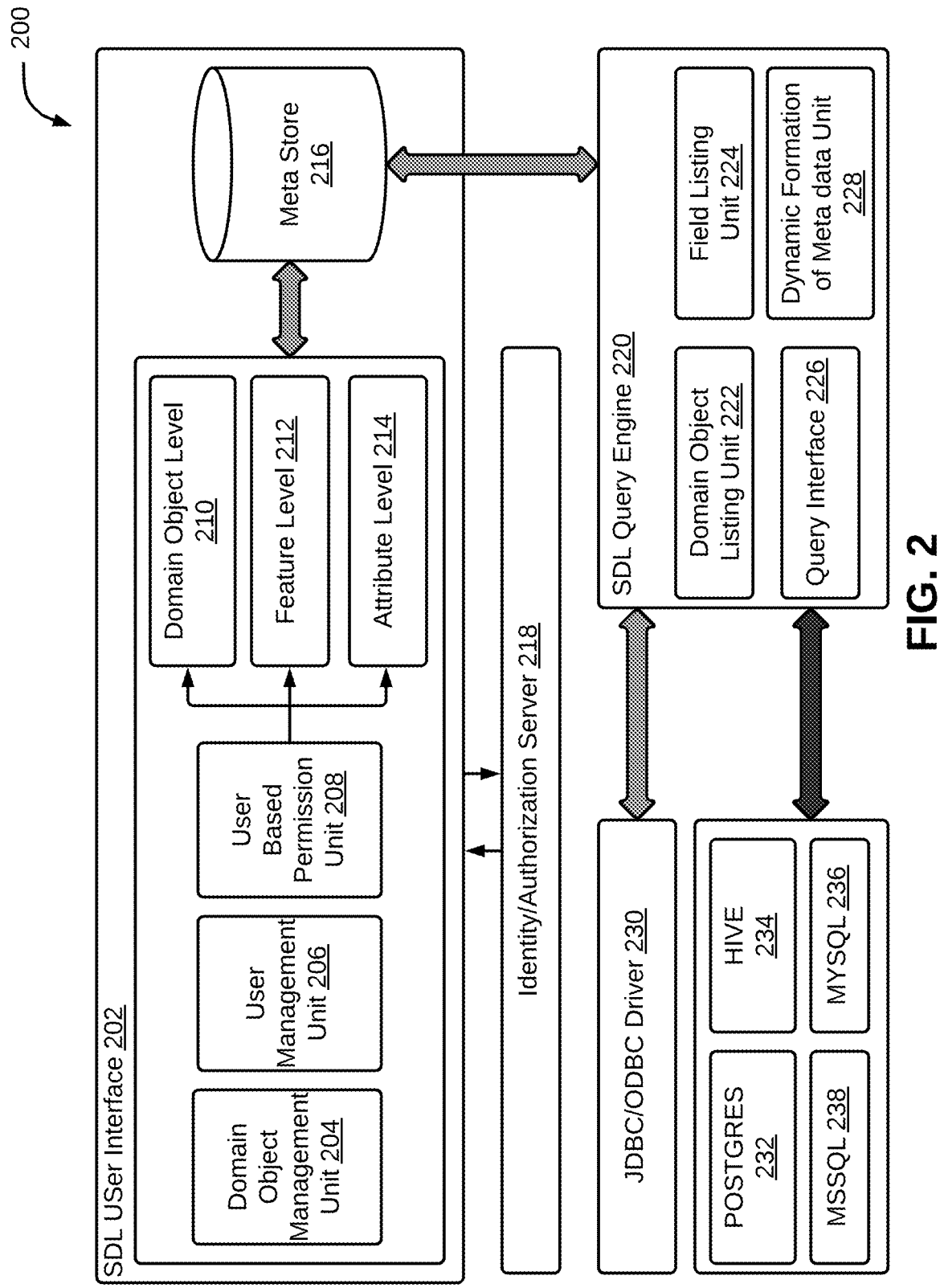
FIG. 2 illustrates a flow diagram of a semantic domain layer used for providing profile based data access, in accordance with an embodiment.

Referring now to FIG. 2, a flow diagram of a semantic domain layer 200 used for providing profile based data and visualization access through is illustrated, in accordance with an embodiment. In reference to FIG. 1, the semantic domain layer 200 may correspond to the semantic domain layer 102. The semantic domain layer 200 may include a set of components. The set of components may include an SDL user interface 202, an SDL query engine 220, and a JDBC/ODBC driver 230.

First component from the set of components, i.e., the SDL user interface 202 may be configured to provide a set of functionalities to each of a plurality of users. In this embodiment, each of the plurality of users may correspond to an administrator or a user of the semantic domain layer 200. The set of functionalities may include an ease to access, create and manage each of a plurality of domain objects, selection of at least one data source, a set of tables, a plurality of fields, and an access level, and access permission. The access level may correspond to one of a first set of access levels and one of a second set of access level. In an embodiment, the first set of access levels may be associated with the plurality of users and the plurality of domain objects. Additionally, the second set of access levels may correspond to an encrypted access and a masked access associated with a plurality of fields within a set of tables. In an embodiment, each of the set of tables may be associated with one of the plurality of domain objects.

In order to provide access of the set of functionalities, the SDL user interface 202 may include a domain object management unit 204, a user management unit 206, and a user based permission unit 208. The user based permission unit 208 may be associated with a domain object level 210, a feature level 212, and an attribute level 214. In particular, the domain object management unit 204 may be configured to manage data received from multiple data sources. In an embodiment, the data received from multiple data sources may be associated with the plurality of domain objects. Further, the domain object management unit 204 may identify a set of tables associated with each of the plurality of domain objects.

Moreover, the data received from multiple data sources may be present in denormalized form in each of the set of tables. It should be noted that, every row of the set of tables identified may correspond to an instance of each of the plurality of domain objects. Once the set of tables are identified, the domain object management unit 204 may normalize data present within each of the set of tables. In other words, the domain object management unit 204 may create an alias for at least one of a plurality of fields within the set of tables. The plurality of fields may correspond to one of a row and a column within one of the set of tables. In an embodiment, the alias may be created to standardize data representation across each of the set of tables.

In an embodiment, each of the plurality of domain objects may also be referred as an entity set. Moreover, each of the plurality of domain objects may correspond to a collection of categorical properties, i.e., feature vectors and attribute vectors. In an embodiment, the feature vectors may correspond to a plurality of rows present within the set of tables. In addition, the attribute vectors may correspond to a plurality of columns present within the set of tables. Further, each of the collection of categorical properties may be used for setting granular level access permissions on each of the plurality of domain objects based on the plurality of user profiles. The plurality of user profiles may correspond to each of the plurality of users.

Further, the user management unit 206 may be configured to create and manage each of the plurality of user profiles corresponding to the plurality of users. In an embodiment, each of the plurality of user profiles may be created based on at least one of the plurality of user attributes associated with each of the plurality of users. The plurality of user attributes may include, but are not limited to at least one of employee ID, organization ID, team ID, business unit ID, user location, current designation, department, user type, and access level. An exemplary embodiment depicting creation of user profile has been explained in detail in conjunction with FIG. 8.

Moreover, the user based permission unit 208 may be configured to assign the access level and the access permission to access at least one of the plurality of domain objects. The access level and access permissions may be assigned based on the user profile of each of the plurality of users. The access level may correspond to one of a first set of access level and one of a second set of access level. In addition, the access permissions may correspond to permissions defined for each of the plurality of users to access the plurality of domain objects. In an embodiment, the access permission may be defined based on the access level assigned.

In an embodiment, a first access level from the first set of access levels may be assigned to each of the plurality of users. In addition, a second access level form the first set of access levels may be assigned based on each of the plurality of domain objects. In present FIG. 2, the second access level corresponding to each of the plurality of domain objects may assigned at the domain object level 210.

In one embodiment, when the second access level from the first set of access levels may be defined to be the public access level for at least one domain object from the plurality of domain objects, name of the at least one domain object may be visible to one or more of the plurality of user based on their associated user profiles. In addition, the at least one domain object may be accessible by each of the plurality of users. In another embodiment, when the second access level from the first set of access levels may be defined to be the private access level for at least one domain object from the plurality of domain objects, name and accessibility of the at least one domain object may be provided to at least one user from the plurality of users having permissions to see and access the at least one domain object. In yet another embodiment, when the second access level from the first set of access levels may be defined to be the protected access level for at least one domain object from the plurality of domain object, name of the at least one domain object may be visible to each of the plurality of users. In addition, the at least one domain object may be accessible by at least one of the plurality of users having permissions to access the at least one domain object.

Further, one of the second set of access levels may be assigned to at least one of the plurality of fields. In an embodiment, the second set of access levels may include the encrypted access and the masked access of one of the plurality of fields, to at least one of the plurality of users. Each of the plurality of fields may be present within the set of tables. Further, each of the plurality of fields may correspond to one of the row and the column within one of the set of tables. In an embodiment, an access level from the second set of access levels corresponding to the row of at least one of the plurality of fields may be assigned at the feature level 212. In addition, an access level from the second set of access level corresponding to the column of at least one of the plurality of fields may be assigned at the attribute level 214.

Once the plurality of user profiles and the plurality of domain objects are created, the SDL user interface 202 may verify a user request received to access data via an identify/authorization server 218. In addition, the identify/authorization server 218 may be configured to identify profile of the user that may be requesting the access of the data. Moreover, the identify/authorization server 218 may be responsible to map the user with the domain object associated with the user profile.

Further, the SDL user interface 202 may store a metadata information associated with each of the plurality of users to access each of the plurality of domain objects in a metadata store 216. The metadata information may include the user profile of each of the plurality of users, information of each of the plurality of domain objects, and the access level assigned to each of the plurality of users for the plurality of domain objects. Once the metadata information is stored in the metadata store 216, then the stored metadata information may be utilized by the SDL query engine 220.

The SDL query engine 220 may utilize the metadata information to provide access of at least one domain object from the plurality of domain objects to at least one of the plurality of users. In an embodiment, the SDL query engine 220 may correspond to data definition web Application Programming Interface (API). Moreover, the SDL query engine 220 may provide access of data present in the at least one domain object to at least one of the plurality of users based on the access level defined for the at least one of the plurality of users. A method of providing access of the at least one domain object has been explained in detail in conjunction with FIG. 3.

Further, in order to provide access of the data to the at least one user, the SDL query engine 220 may include a domain object listing unit 222, a field listing unit 224, a query interface 226, and a dynamic formation of metadata unit 228. The domain object listing unit 222 may be configured to list a set of allowed domain object from the plurality of domain objects that is accessible by the at least one user. The field listing unit 224 may be configured to list one or more fields present within the set of tables to the at least one user. Each of the set of tables may be associated with the set of allowed domain objects that is accessible by the at least one user. The query interface 226 may be configured to verify a query generated to access the domain.

The query generated may be represented as depicted below via an equation (1):

$$\text{DomainObject·ObjectProperty·AccessControlled=True/False} \quad (1)$$

In above equation (1), domain object may correspond to the domain object from the plurality of domain objects. Object property may correspond to a type of the domain object. In other words, the object property may depict a set of predefined properties associated with the domain object. By way of an example, one of the set of predefined properties may correspond to the first set of access level defined for the domain object. The first set of access level may include a public access level, a private access level, and a protected access level. In an embodiment, the administrator of the semantic domain layer 200 may define one of the first set of access levels for at least one user to access the domain object. Further, the administrator of the semantic domain layer 200 may modify the one of the first set of access levels defined for the domain object as per requirement of the at least one user. For example, the administrator may modify one of the first set of access levels based on organizational hierarchy (e.g., parent, child of) and type of data present in the domain object (e.g., master data, transaction data).

Access control may correspond to the access permission defined for the at least one user corresponding to the domain object. In an embodiment, when the query generated may be defined to be true, then the data of that domain object may be accessible by the at least one user. In another embodiment, when the query generated may be defined to be false, then the data of that domain object may not be accessible by the at least one user. It should be noted that, default value of the query generated for each of the plurality of domain objects may be defined to be false. Moreover, user (i.e., the administrator) of the semantic layer may change the default value based on his requirement.

Further, in order to verify the query generated, the SDL query engine 220 may interact with the metadata store 216 of the SDL user interface 202 and a JDBC/ODBC driver 230. In other words, the SDL query engine 220 may act a connector between the SDL user interface 202 and the JDBC/ODBC driver 230. Once the generated query is verified, the dynamic formation of metadata unit 228, may dynamically fetch and render the data corresponding to the set of allowed domain objects, to the at least one user.

In an embodiment, the JDBC/ODBC driver 230 may be configured to hold list of each of the plurality of domain objects and the plurality of fields corresponding to each of the plurality of users. In addition, the JDBC/ODBC driver 230 may be configured to retrieve one of the second access level assigned to the row for each of the plurality of fields from the set of allowed domain objects. It should be noted that, the JDBC/ODBC driver 230 may be available as 32 bit and 64 bit to support framework for the semantic domain layer 200. In an embodiment, the JDBC/ODBC driver 230 may also be referred as data connection drivers.

Further, the JDBC/ODBC driver 230 may facilitate querying of data received from various data sources via the semantic domain layer 200. In addition, queries in standard Structured Query Language (SQL) may be directly accessed via the JDBC/ODBC driver 230 to query data including conditions like, 'where', 'group' and 'order'. In addition, the JDBC/ODBC driver 230 may be highly optimized to enables better performance for the semantic domain layer 200. In addition, the JDBC/ODBC driver 230 provides an additional layer of data security for the data.

In order to facilitate querying of data, the JDBC/ODBC driver 230 may include POSTGRES 232, HIVE 234, MYSQL 236, and MSSQL 238. The POSTGRES 232 may correspond to an open source object relational database management system. The HIVE 234 may correspond to a data warehouse software. The MYSQL 236 may correspond to a community driven database management system. The MSSQL 238 may correspond to a relational database management system.

In particular, as will be appreciated by those of ordinary skill in the art, the semantic domain layer 200 described herein may be implemented in any computing device, either by hardware, software, or combinations of hardware and software. For example, suitable code may be accessed and executed by the one or more processors on any computing device to perform some or all of the techniques described herein. Similarly, application specific integrated circuits (ASICs) configured to perform some or all of the processes described herein may be included in the one or more processors on the computing system. Moreover, the functionality of various components of the semantic domain layer 200 may be integrated with any computing devices.

Figure 3:
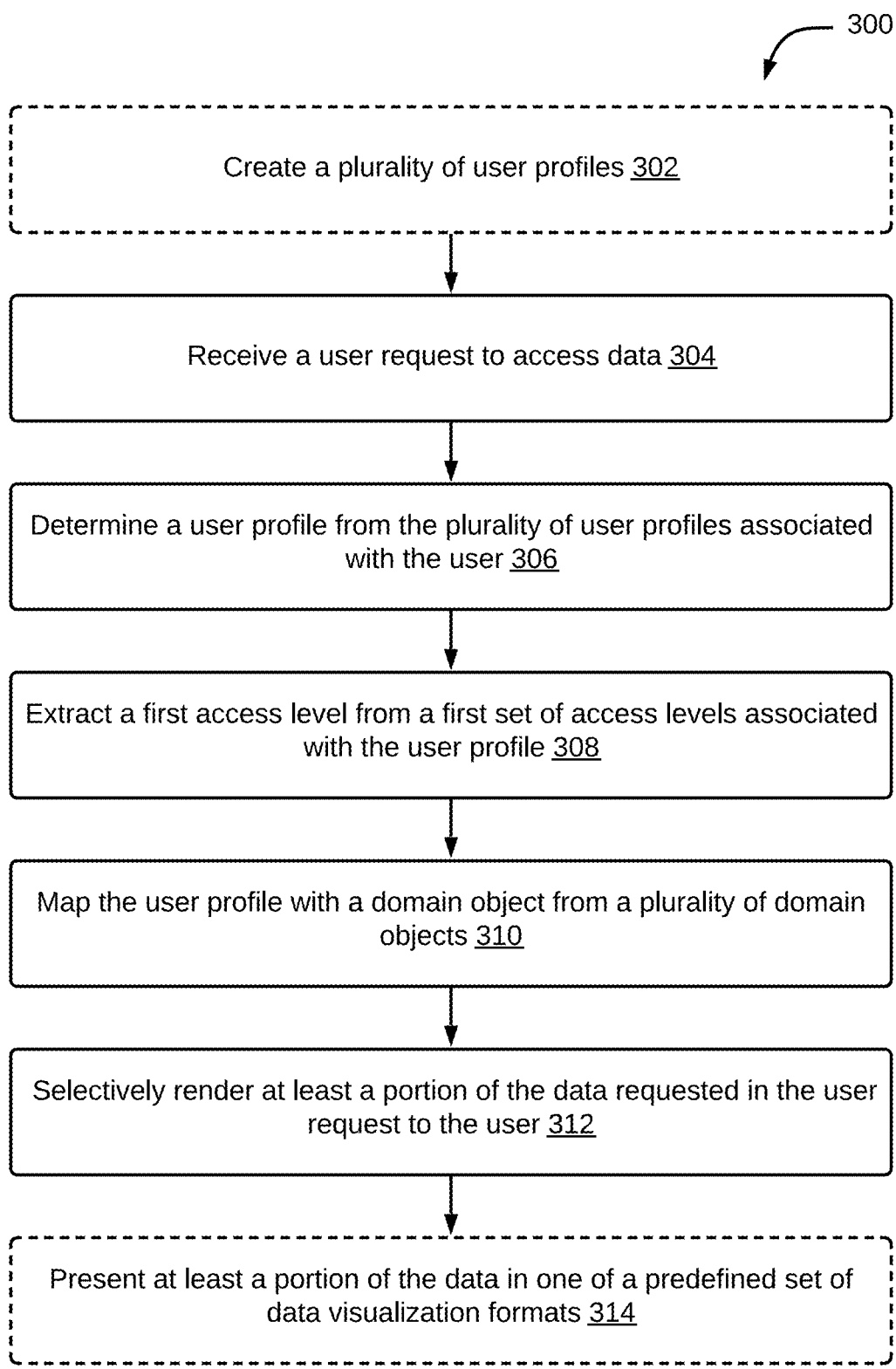
FIG. 3 illustrates a flowchart of a method for providing profile based data access through a semantic domain layer, in accordance with an embodiment.

Referring now to FIG. 3, a flowchart of a method for providing profile based data access through a semantic domain layer is illustrated, in accordance with an embodiment. In reference to FIG. 1 and FIG. 2, once the semantic domain layer is created, any user may access data via the semantic domain layer (for example, the semantic domain layer 102) based on their user profile. Initially, at step 302, a plurality of user profiles may be created. In an embodiment, the plurality of user profiles may correspond to a plurality of users. Moreover, each of the plurality of user profiles may be associated with at least one of a plurality of user attributes. The plurality of user attributes may include at least one employee ID, organization ID, team ID, business unit ID, user location, current designation, department, user type, and access level. In other words, each of the plurality of user attributes associated with the plurality of user profiles may be defined based on goal, role, and scope of work associated with each of the plurality of users. In an embodiment, each of the plurality of user profiles may correspond to a user persona.

Once the plurality of user profiles is created, at step 304, a user request may be received to access data. In an embodiment, the data may correspond to an information associated with at least of a plurality of domain objects. Upon receiving, the user request, at step 306, a user profile associated with the user may be determined from the plurality of user profiles created. In other words, the user profile of the user requesting the access of the data may be determined. Once the user profile is determined, at step 308, a first access level associated with the user profile may be extracted from a first set of access levels. In other words, the first access level may correspond to an access level associated with the user profile. In an embodiment, the first set of access levels may include a public access level, a private access level, and a protected access level.

By way of an example, based on the first access level extracted, the user profile may be validated. In order to validate the user profile, a check may be performed. The check may be performed to identify which one of the public access level, the private access level, or protected access level the first access level extracted corresponds to. In one embodiment, when the first access level extracted corresponds to the public access level, then the user of that user profile may only have access to all public data. In another embodiment, when the first access level extracted corresponds to the private access level, then the user of that user profile may additionally have access to all private data. In yet another embodiment, when the first access level extracted corresponds to the protected access level, then the user of that user profile may additionally have access to all protected data in hashed format.

Once the user is validated based on the first access level extracted, at step 310, the user profile may be mapped with a domain object from a plurality of domain objects. A process of mapping the user profile with the domain object is explained in detail in conjunction with FIG. 4. In an embodiment, the user profile may be mapped with the domain object based on a second access level from the first set of access levels associated with the domain object. In other words, the second access level may correspond to an access level associated with the domain object. By way of an example, based on the assigned second access level, the domain object may be identified. In order to identify the domain object, a check may be performed on the mapped domain object. The check may be performed to determine that the second access level associated with the domain object corresponds to which one of the public access level, the private access level, or protected access level.

In one embodiment, when the second access level associated with the domain object corresponds to the public access level, then the user may be able to see name of that domain object. In addition, the user may be able to access all data present in the domain object corresponding to the public access level. In another embodiment, when the second access level associated with the domain object corresponds to the private access level. Then, the user may be able to see name and access data of that domain object only if the user has permission to access that domain object. In yet another embodiment, when the second access level associated with the domain object corresponds to the protected access level. Then, the name of the domain object may be visible to the user. However, the user may access data of the domain object with protected access level, only when he has permission to access data.

Once the mapping of the user profile with the domain object is done, at step 312, at least a portion of the data requested may be selectively rendered to the user. In an embodiment, the portion of data may correspond to a part of the data requested by the user in the user request. It should be noted that, the portion the data requested may be rendered to the user in response to mapping the user profile with the domain object. Moreover, at step 314, at least a portion of the data requested by the user may be presented in one of a predefined set of data visualization formats. The predefined set of data visualization formats may include, but is not limited to, charts, graphs, tables, and diagrams.

Figure 4:
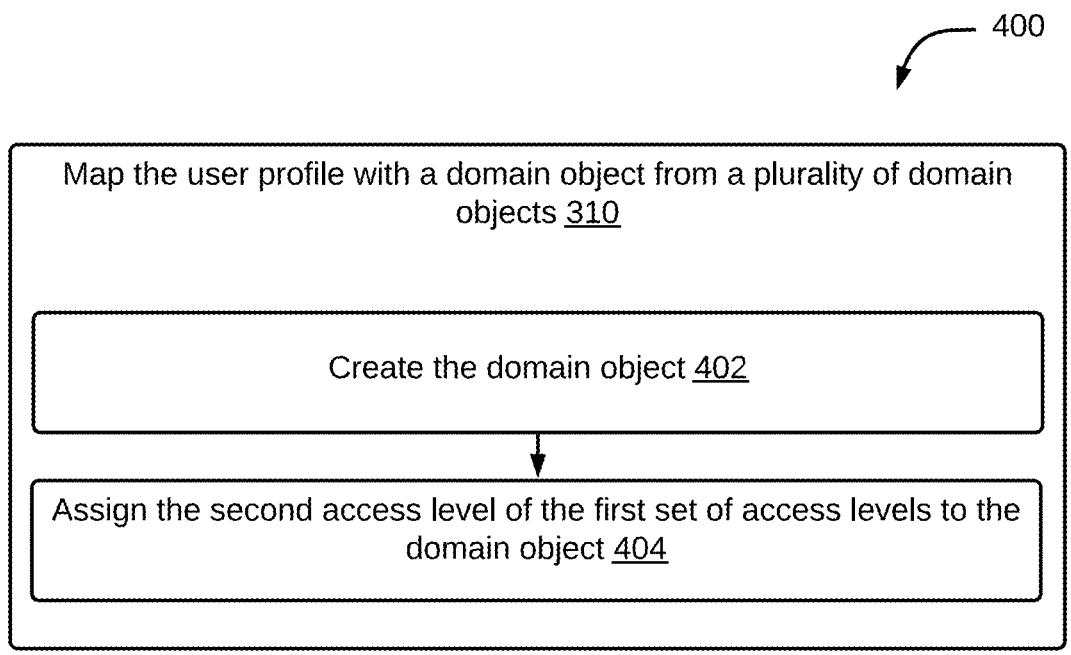
FIG. 4 illustrates a flowchart of a method of mapping a user profile with a domain object from a plurality of domain objects, in accordance with an embodiment.

Referring now to FIG. 4, a flowchart of a method of mapping a user profile with a domain object from a plurality of domain objects is illustrated, in accordance with an embodiment. In reference to FIG. 3, as mentioned in step 310, in order to map the user profile with the domain object, at step 402, a domain object may be created. In an embodiment, the domain object created may be communicatively coupled to a semantic domain layer. In reference to FIG. 1, the semantic domain layer may correspond to the semantic domain layer 102. A process of creating the domain object has been explained in detail in conjunction with FIG. 5. It should be noted that, for ease of explanation creation of one domain object is considered. However, the plurality of domain objects may be initially created. Further, based on the user request received the domain object from the plurality of domain objects may be mapped.

Once the domain object is created, at step 404, the second access level from the first set of access levels is assigned to the domain object. The first set of access levels may include the public access level, the private access level, and the protected access level. It should be noted that, the second access level may be assigned to each of the plurality of domain objects created. Once the second access level is assigned to each of the plurality of domain objects, mapping of the user profile may be done with the domain object from the plurality of domain objects.

Figure 5:
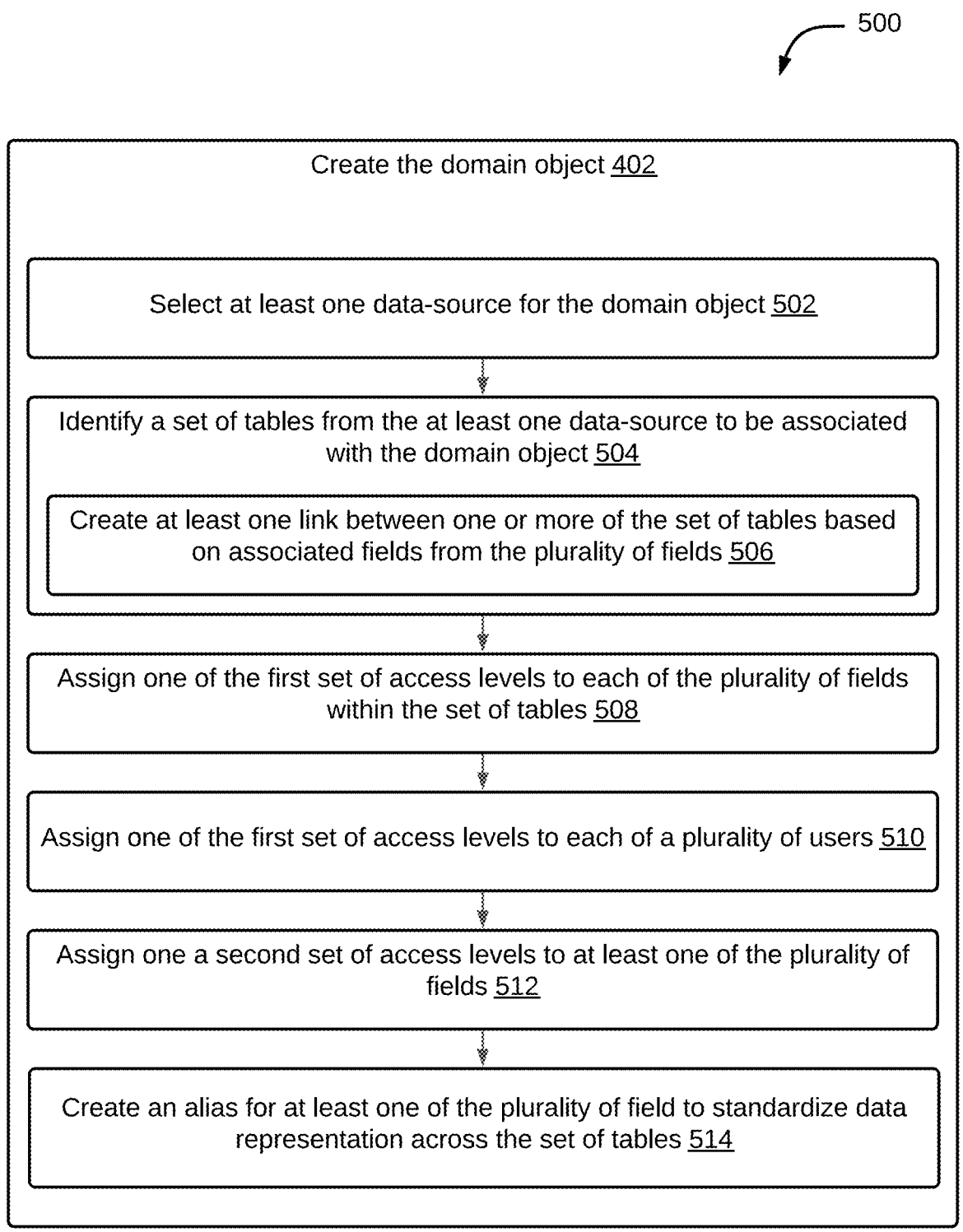
FIG. 5 illustrates a flowchart of a method for creating a domain object, in accordance with an exemplary embodiment.

Referring now to FIG. 5, a flowchart of a method for creating domain objects is illustrated, in accordance with an exemplary embodiment. In conjunction to FIG. 4, in order to create the domain as mentioned in step 402, at step 502, at least one data source may be selected for the domain object. Examples of the at least one data source may include, but are not limited to any type of databases, flat files, web services, and any other sources such as RSS feed. Once the at least one data source is selected, at step 504, a set of tables from the at least one data source. The set of tables identified may be associated with the domain object. Further, in order to identify the set of tables from the at least one data source, at step 506, at least one link may be created between one or more of the set of tables. In an embodiment, the at least one link may be created based on associated fields from the plurality of fields.

Upon identifying the set of tables, at step 508, one of the first set of access levels may be assigned to each of the plurality of fields. In an embodiment, each of the plurality of fields may be present within the set of tables. Further, at step 510, one of the first set of access level may be assigned to each of the plurality of users. In reference to FIG. 3, one of the first set of access levels assigned to each of the plurality of users may correspond to the first access level. Moreover, one of the first set of access level may be assigned for each of the plurality of domain objects and associated one or more fields. In reference to FIG. 3, one of the first set of access levels assigned to each of the plurality of domain objects may correspond to the second access level.

Further, at step 512, a second set of access levels may be assigned to at least one of the plurality of fields. In an embodiment, the second set of access level may include, but are not limited to an encrypted access and a masked access. In addition, each of the plurality of fields may correspond to one of a row and a column within one of the set of tables. In an embodiment, once the first set of access levels and the set of access levels are assigned, at step 514, an alias may be created for at least one of the plurality of field. In an embodiment, the alias may be created to standardize data representation across the set of tables.

Figure 6A:
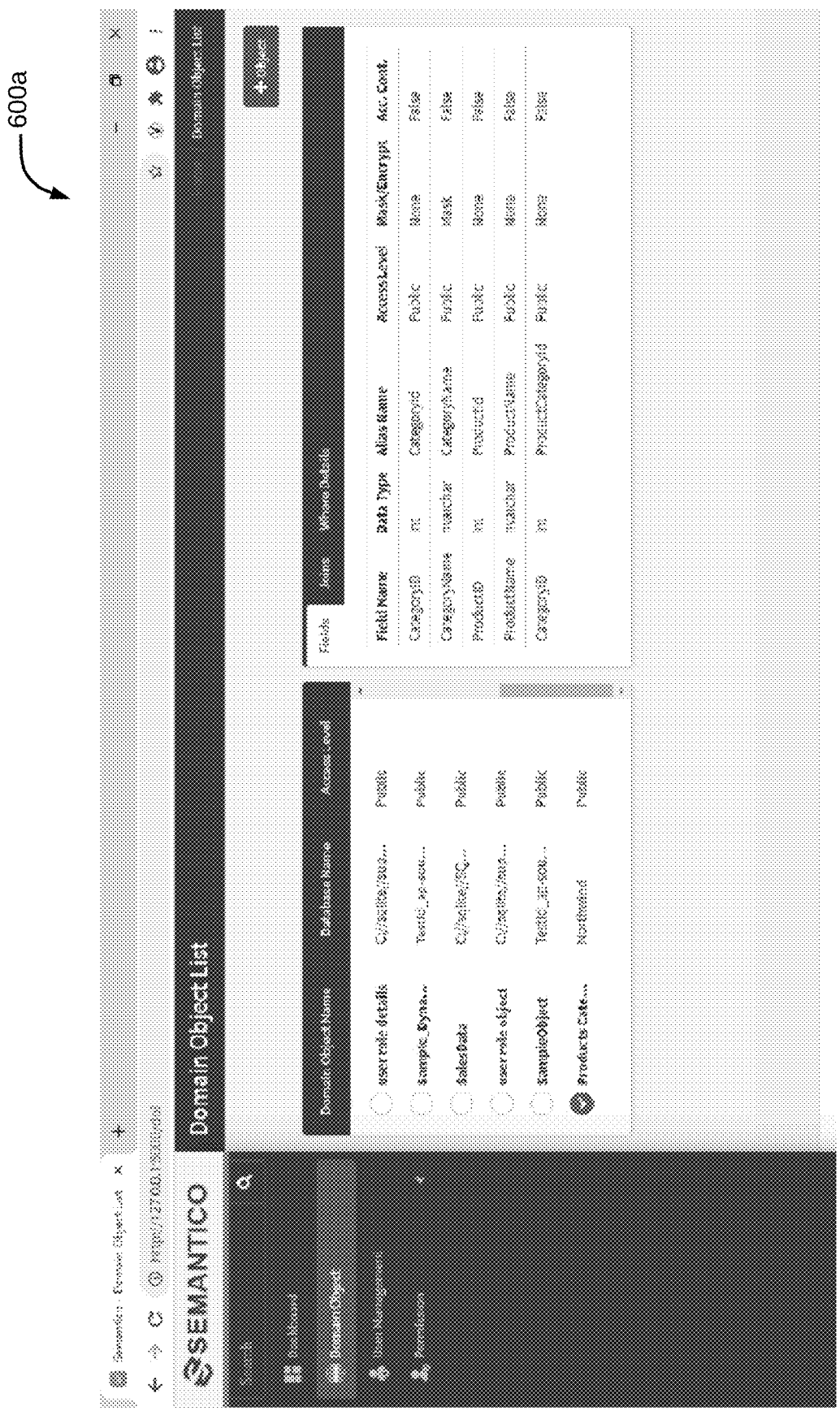
FIGS. 6A-6H illustrate an exemplary representation of creation of a domain object, in accordance with an exemplary embodiment.

Referring now to FIGS. 6A— 6H, an exemplary representation of creation of a domain object is depicted, in accordance with an exemplary embodiment. In FIG. 6A, a User Interface (UI) 600*a* of a semantic domain layer representing a list of the plurality of domain objects is depicted. It should be noted that, for ease of explanation, creation of one domain object is illustrated. However, each of the plurality of domain objects may be created as illustrated in present FIGS. 6A-6H. In reference to FIG. 1, the semantic domain layer may correspond to the semantic domain layer 102. Left side of the UI 600*a* represents a menu that includes a set of options. The set of options includes dashboard, domain object, user management, and permissions. Each of the plurality of users may select one of the set of options based on his requirement. For example, a user from the plurality of users may select domain object option to view a list of plurality of domain objects created. The domain object list includes a first set of selectable options.

The first set of selectable options includes domain object name, database name, and access level as depicted in present FIG. 6A. The domain object name may represent name of each of the plurality of domain objects. For examples, domain object name 'sales data' may include data associated with sales. Further, database name may represent data source from which data associated with that domain object name is fetched. Further, access level may represent access level assigned for each of the plurality of domain objects. In an embodiment, the access level may be assigned initially while creating each of the plurality of domain objects.

Moreover, the domain object list represented on the user interface 600*a* further depicts a second set of selectable options. The second set of selectable options includes fields, joins, and where details. In present FIG. 6A, fields option is selected. The field option selected may depict field name of each of the plurality of field. Data type associated with each of the plurality of fields. Access level assigned for each of the plurality of fields. Mask/encrypted access assigned for each of the plurality of fields. In an embodiment, access control may correspond to the access level, i.e., the first set of access levels and the second set of access levels. In an embodiment, a default value for the access control may be defined to be the public access level for the plurality of users to access each of the plurality of fields. Moreover, one or more of the plurality of users with access control defined to be the public access level may not have access of at least one of the plurality of fields with the protected access level and the private access level. Further, one or more of the plurality of users with access control defined to be the protected access level may have access of entire schema of the domain object. However, data of at least one of the plurality of fields having the private access level may be selectively masked from one or more of the plurality of users having the protected access level. In addition, one or more of the plurality of users with access control defined to be the private access level may have access of entire schema of the domain object without any masked/encrypted access on data present in each of the plurality of fields. It should be noted that, the access level for the plurality of fields corresponding to the row may be defined explicitly so that partial or full data is visible to at least one of the plurality of users. Moreover, the access level defined for the plurality of fields corresponding to the row may not override the encrypted access and the masked access defined for the column of the plurality of fields. In addition, each of the plurality of user may be able to create a new domain object via an '+object' button present below header of the UI 600*a*.

Figure 6B:
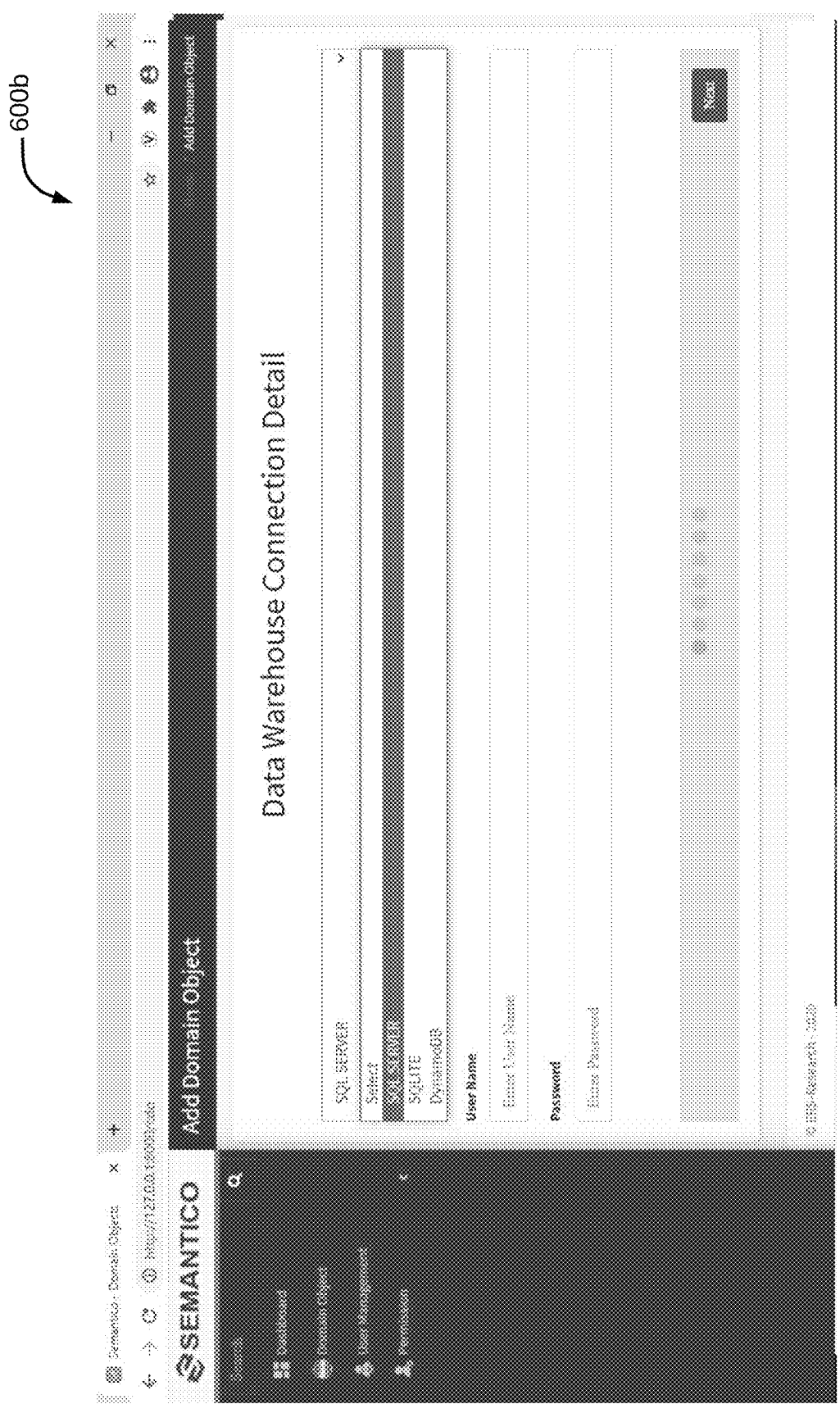

Once a user from the plurality of user selects the '+object' button to create the new object domain, a UI 600*b* of the semantic domain layer may be opened as depicted in FIG. 6B. The user may create the new domain object via the UI 600*b*. In order to create the new domain object, the user may select one of a data warehouses details from a drop down list as depicted in UI 600*b*. In FIG. 6B, the drop down list includes SQL server, SQLite, and dynamic database. It should be noted that, the drop down list may include any number of data warehouse details. Once the one of the data warehouse details is selected, the user needs to enter his login credentials, i.e., a username and a password to create the new domain object. Once the user enters details in the UI 600*b*, then the user needs to click on 'next' button present of right most corner of the UI 600*b* as depicted in FIG. 6B.

Figure 6C:
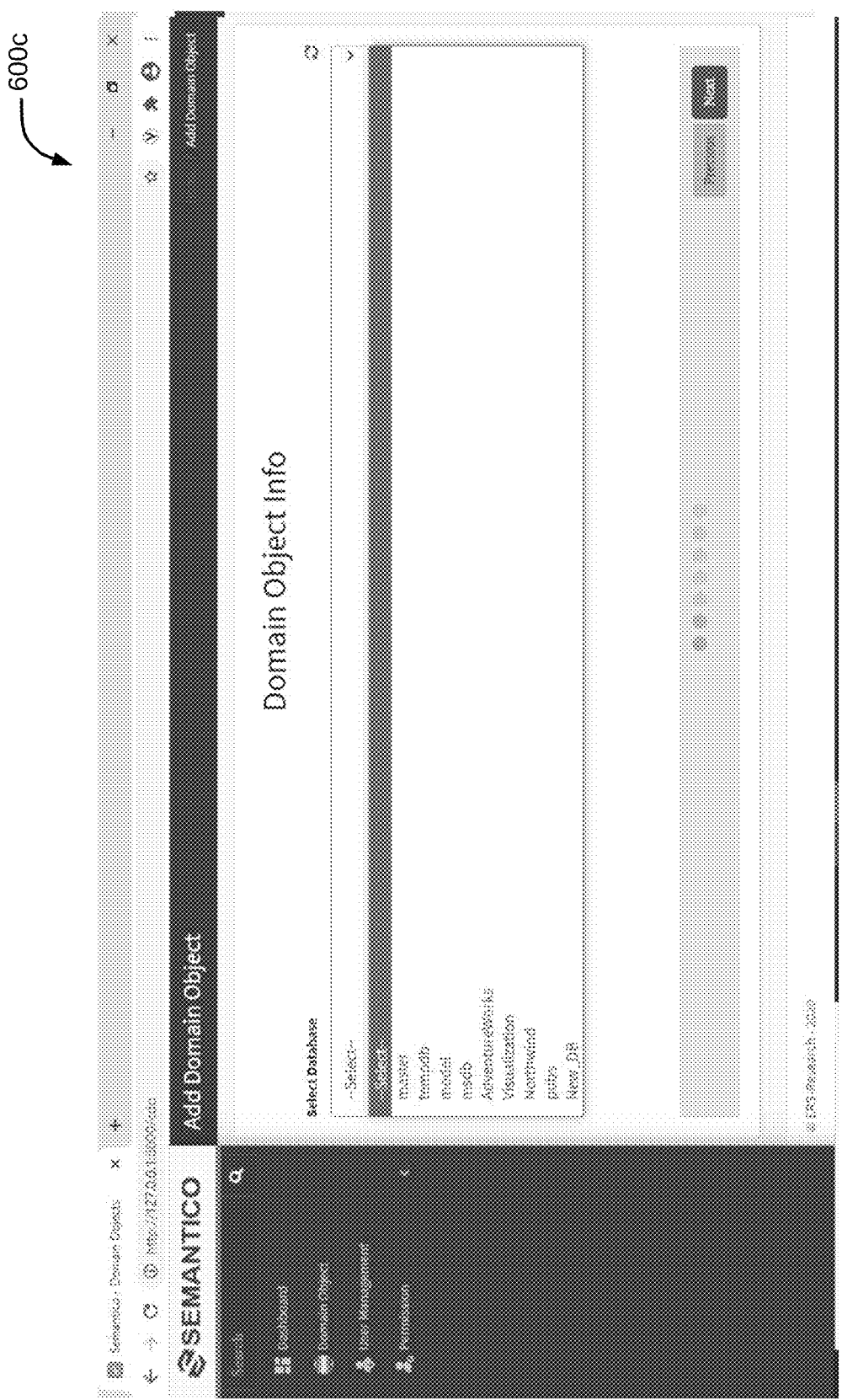

Once the user clicks on the next button, a UI 600*c* may open as depicted in FIG. 6C. The user may easily access at least one data source by providing his login credentials. Further, the user may select at least one data source from a drop drown list depicted in the UI 600*c* as select database.

Once the user selects the at least one data source, the user may click on 'next button' present below in right corner of the UI 600*c*.

Figure 6D:
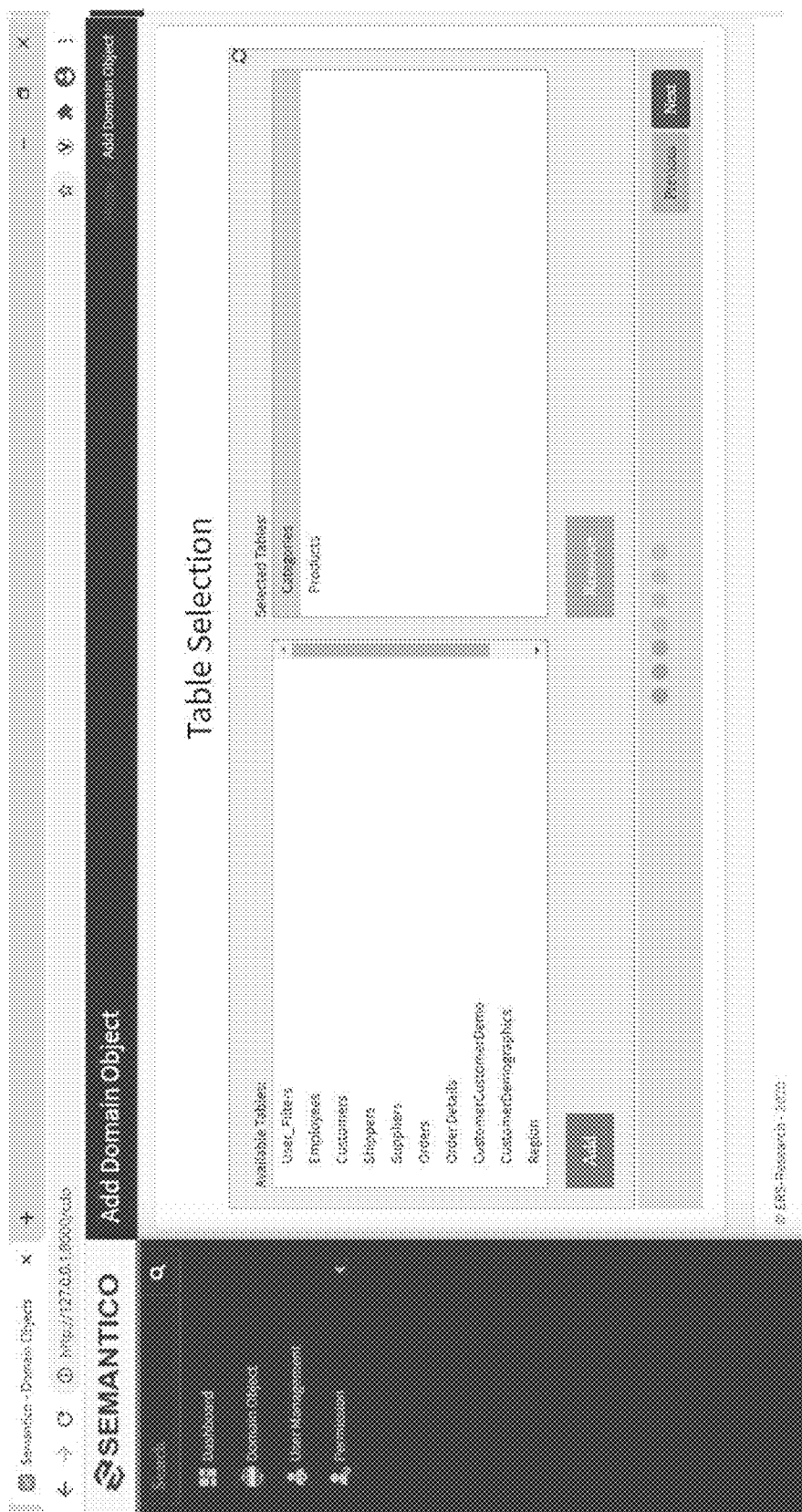

Upon clicking on the next button, based on selection of the at least one data source, a UI 600*d* may be opened as depicted in FIG. 6D. The user may then select relevant tables from a drop down list of available tables to create a new domain object as depicted via the UI 600*d*. In present FIG. 6D, the relevant tables may correspond to selected tables as depicted in the UI 600*d*. In reference to FIG. 5, the relevant tables may correspond to the set of tables identified. In one embodiment, the user can select the relevant tables by clicking on relevant table name and on 'an add button' depicted in the UI 600*d*. In another embodiment, the user may right click on relevant table name and then drag and drop, the relevant table name in the selected tables. In addition, the user may put aliasing for names of the relevant tables. Thereafter, the user may click on next button present below in right corner of the UI 600*d*.

Figure 6E:
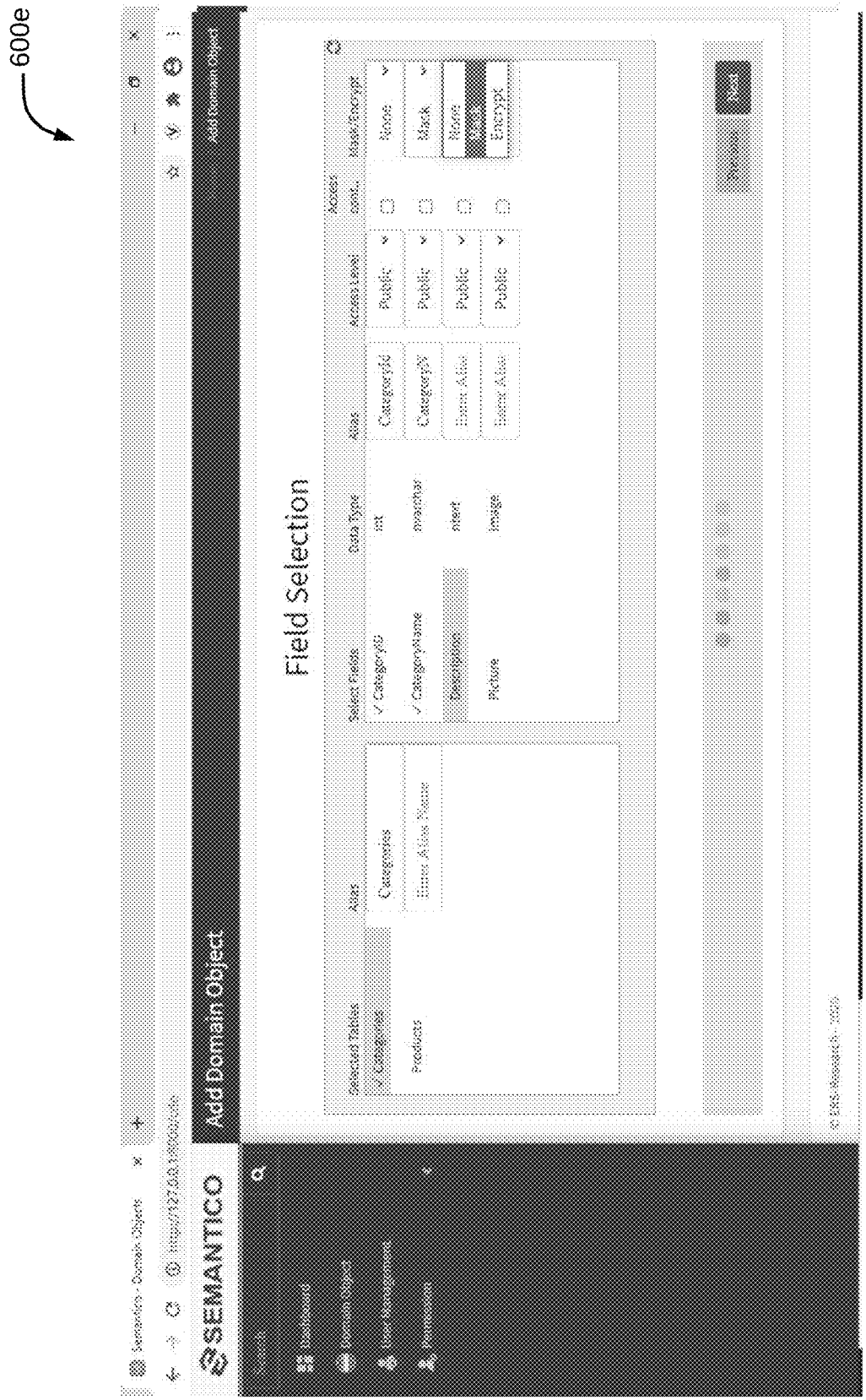

Once the relevant tables are selected, upon clicking on next button, a UI 600*e* may be opened as depicted in the FIG. 6E. The user may then select fields from each of the relevant tables. In reference to FIG. 5, the fields may correspond to the plurality of fields. Further, the user may assign one of the first set of access level to each of the plurality of fields via the UI 600*e*. In addition, the second set of access levels may be assigned to at least one of the plurality of fields via the UI 600*e*. The second set of access levels may include the encrypted access and the masked access on field values. In addition, the user may put aliasing for names of each of the plurality of fields. Thereafter, the user may click on next button present below in right corner of the UI 600*e*.

Figure 6F:
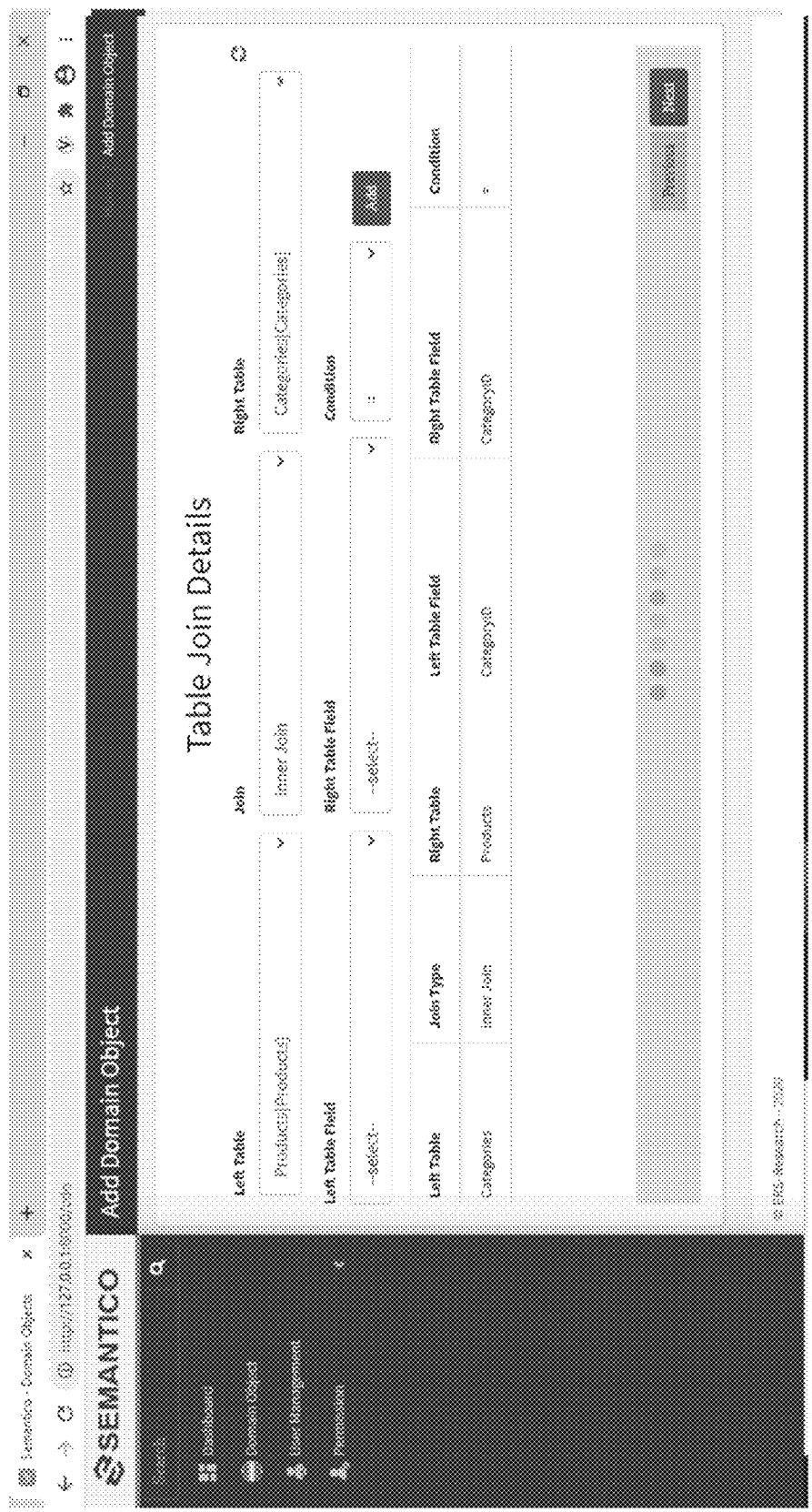

Once the relevant tables and the plurality of fields are selected, then after click on the next button depicted in the UI 600*e*, a UI 600*f* may be opened as depicted via FIG. 6F. The UI 600*f* may depict table join details. The UI 600*f* may capture join details of the relevant tables selected, from the user. In other words, the user may define join details of the relevant tables selected via the UI 600*f*. The user may select a list of possible joins available for the relevant tables from a dropdown list depicted in the UI 600*f*. Once the list of possible joins is selected, the user may click on next button present below in right corner of the UI 600*f*.

Figure 6G:
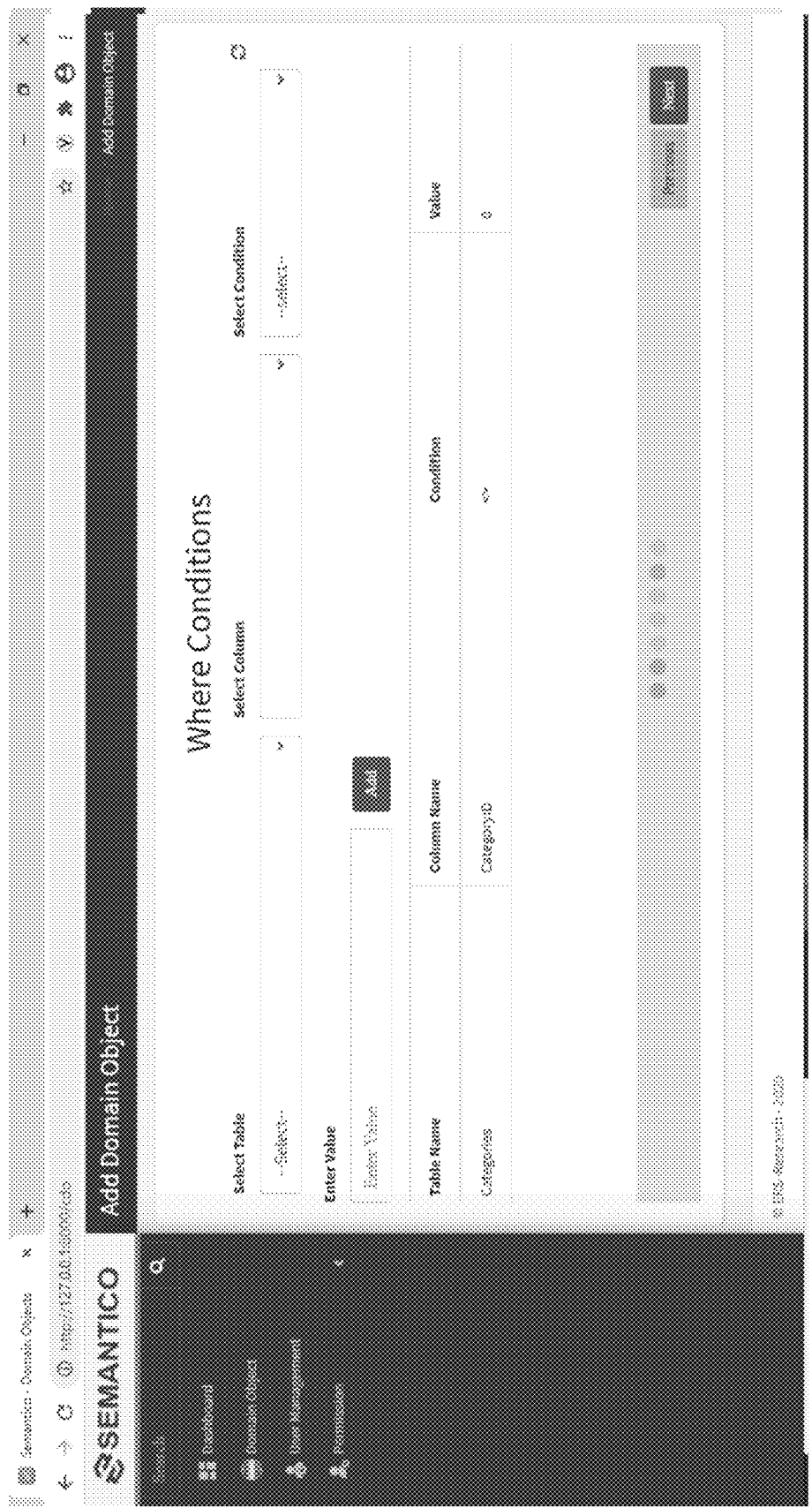
Figure 6H:
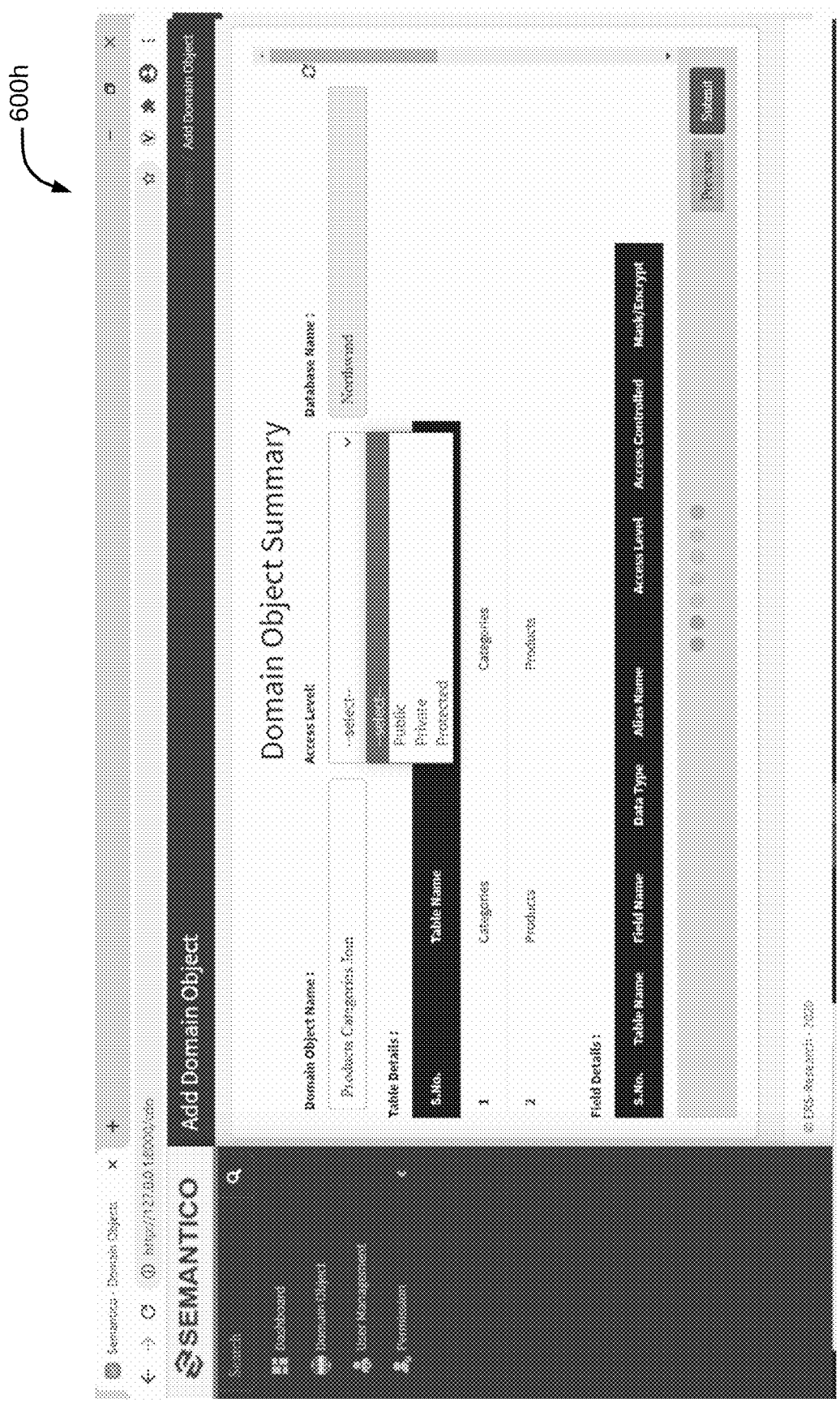

Further, the user may add where condition while creating new domain object via a UI 600*g* as depicted in FIG. 6G. In an embodiment, the user may add multiple condition while fetching data form multiple data sources, as per his requirements. Other examples of multiple conditions may include, but is not limited to, "join', 'group' and 'order'. Moreover, the conditions may be added on basis of metadata information captured for the domain object created. Once the 'where' condition is added, the user may click on next button present below in right corner of the UI 600*g*. In FIG. 6H, a UI 600*h* representing a domain object summary is depicted. The UI 600*h* may represent all information captured in previous FIGS. 6A-6G. In other words, the UI 600*h* may represent information like, the relevant tables selected, the plurality of fields selected, the join details, and the where conditions.

Figure 7A:
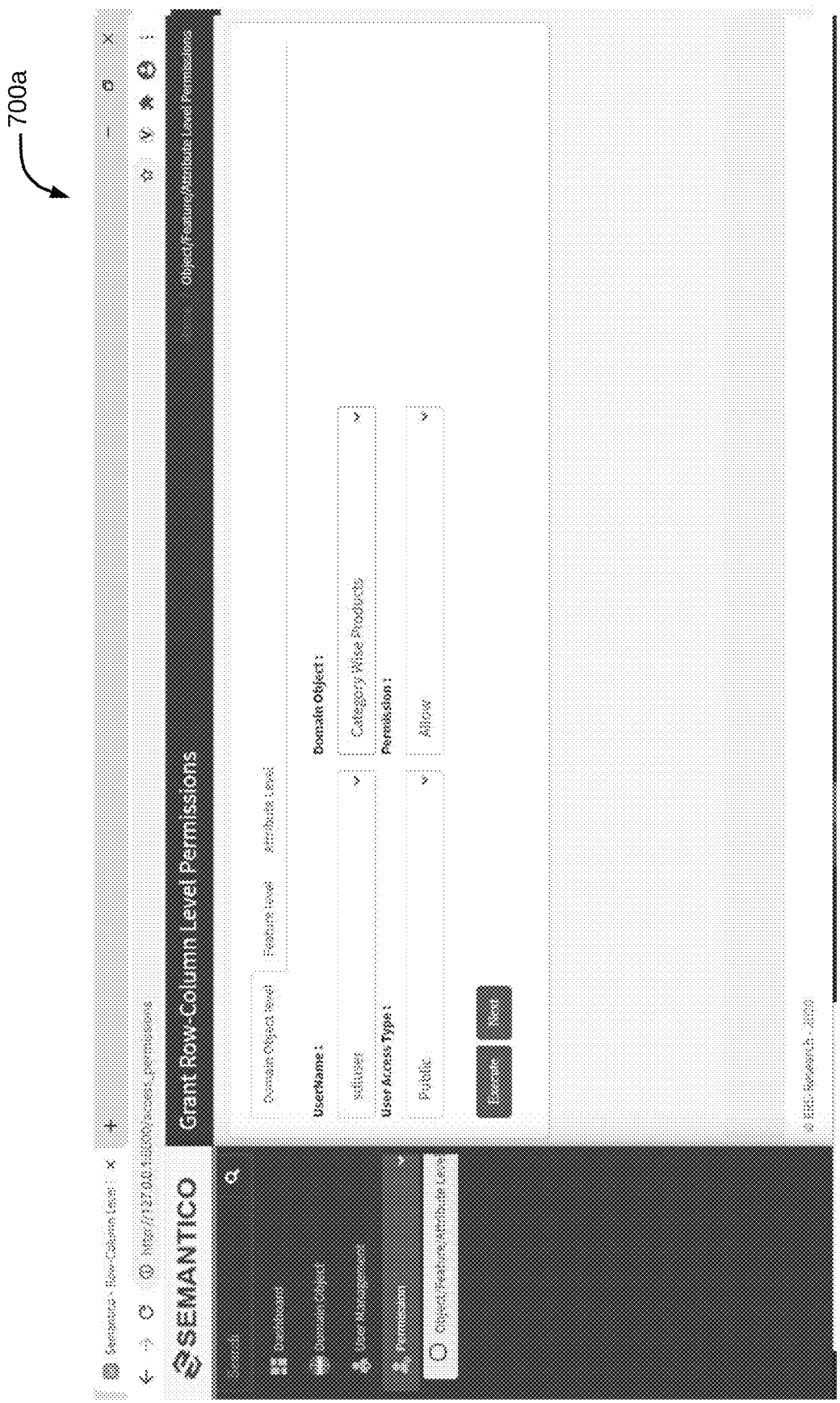
FIGS. 7A and 7C illustrate an exemplary representation of a process of defining a domain object level permission corresponding to a plurality of users, in accordance with an exemplary embodiment.
Figure 7B:
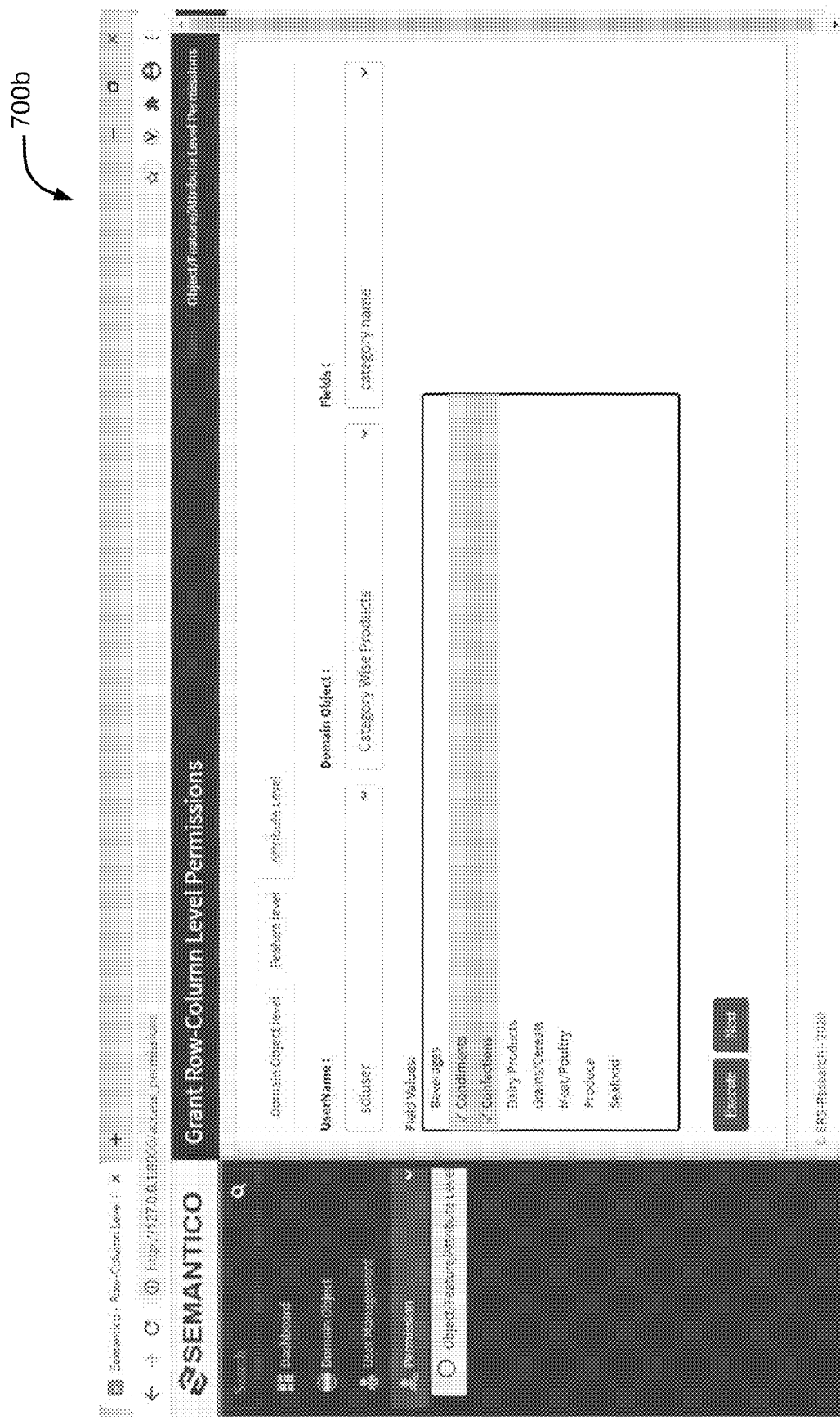
Figure 7C:
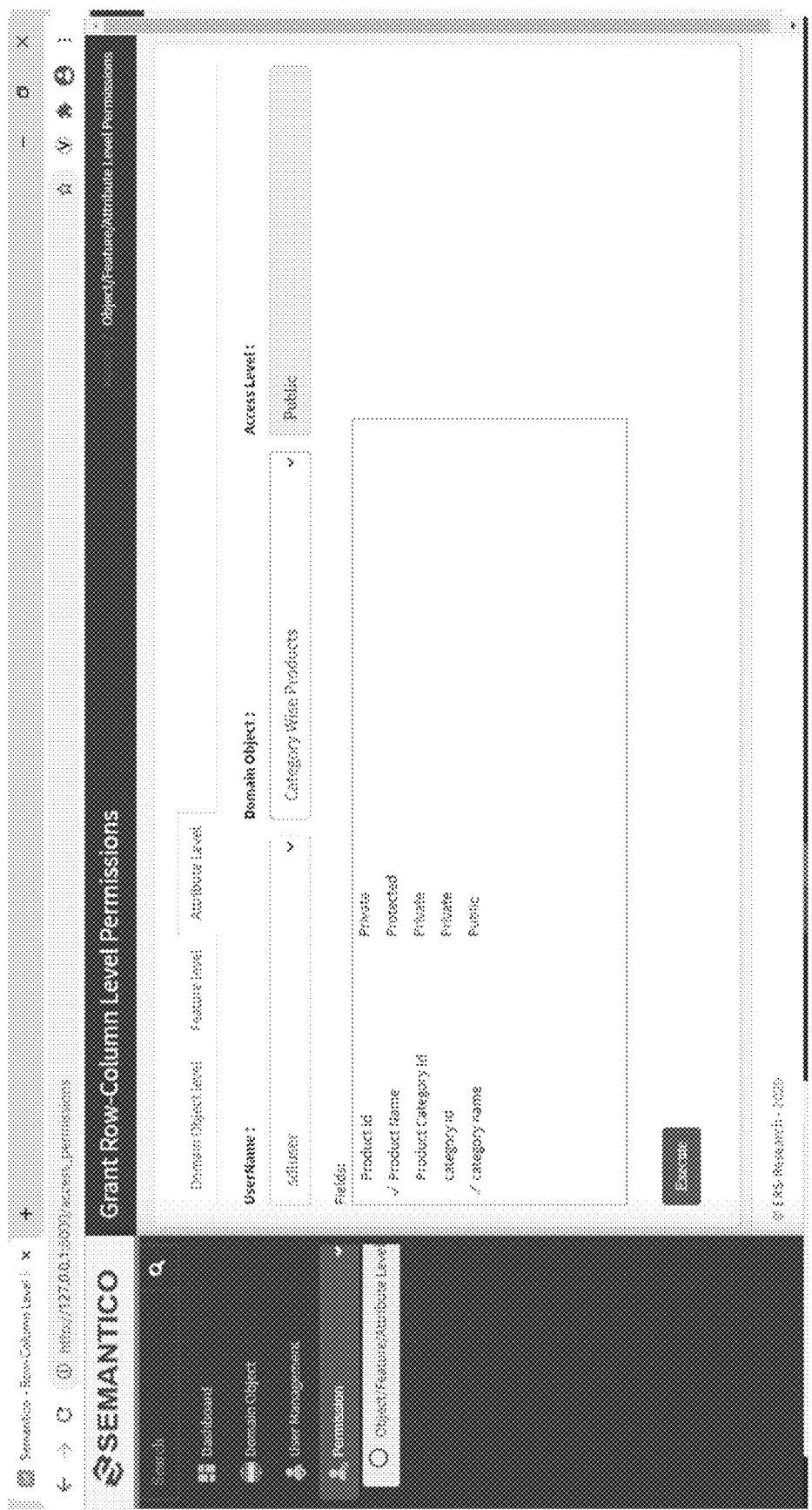

Referring now to FIGS. 7A-7C, an exemplary representation of defining a domain object level permission corresponding to a plurality of users is illustrated, in accordance with an exemplary embodiment. In FIG. 7A, a UI 700*a* of a semantic domain layer is depicted. In reference to FIG. 1, the semantic domain layer may correspond to semantic domain layer 102. As depicted in FIG. 7A, a second access level from the first set of access level may be assigned to each of the plurality of users via the UI 700*a*. The second access level may be assigned to provide access of one or more domain objects to each of the plurality of users. In an embodiment, the first set of access level may include the public access level, the private access level, and the protected access level.

As depicted in present FIG. 7A, in order to assign the second access level for the domain object, a username may be selected. The username may depict the name of the user for whom the access level and the access permissions associated with a specific domain are required to be changed. Further, the specific domain object from the plurality of domain objects may be selected. The specific domain object may correspond to the domain object whose access level and access permissions may be changed for the user selected via the username. Thereafter, user access type name may be selected for the selected username. The user access type selected may depict one of the first set of access level selected. By way of an example, the user access type may be selected to be public access level (i.e., public) corresponding to the username and the specific domain object as depicted via the UI 700*a*.

Lastly, permission to access the specific domain object may defined for the selected username. As depicted in present FIG. 7A, the user selected via the username, may be allowed to access the specific domain object. Once the access level and the access permissions corresponding to the specific domain object are selected for the user, an administrator may click on execute button displayed below in left corner of the UI 700*a*. In an embodiment, the administrator may correspond to a person that may have access to all functionalities of the semantic domain layer. Examples of the administrator may include but is not limited to, owner of organization, head of department, manager, etc. Moreover, via the UI 700*a*, any user from the plurality of user may be restricted to access any domain object just by selecting his username and the domain object.

Once the access level and the access permissions are defined for the user, then the administrator may assign a second set of access level to each of a plurality of fields via a UI 700*b* as depicted in FIG. 7B and FIG. 7C. In an embodiment, each of the plurality of fields may corresponds to one of the row and the column within each of the set of tables. Moreover, the second set of access level may include the encrypted access and the masked access. In reference to FIG. 6D, the set of tables may correspond to the relevant tables selected. It should be noted that, before assigning the second set of access level, one of the first set of access level may be assigned to each of the plurality of fields.

As depicted in FIG. 7B, one of the second set of access level may be assigned for each row associated with each of the plurality of field. In an embodiment, each row present within the set of tables may correspond to the feature vector. Moreover, one of the second set of access level for each row may be easily assigned by selecting the username, the domain object, and one or more field from the plurality of fields. By way of an example, the administrator may allow the selected user to view records of a specific country corresponding to the domain object selected via the UI 700*b*.

Similarly, the second set of access level for each column associated with each of the plurality of field may be assigned via a UI 700*c*. In an embodiment, each column present within the set of tables may correspond to the attribute vector. The administrator may assign the second set of access level for each column corresponding to each of the plurality of users via the UI 700*c*. Moreover, one of the second set of access level for each column may be easily assigned by selecting the username, and the domain object as depicted in present FIG. 7C. In other words, the administrator may restrict or allow access of any column present within the set of tables to any user from the plurality of user.

Figure 8:
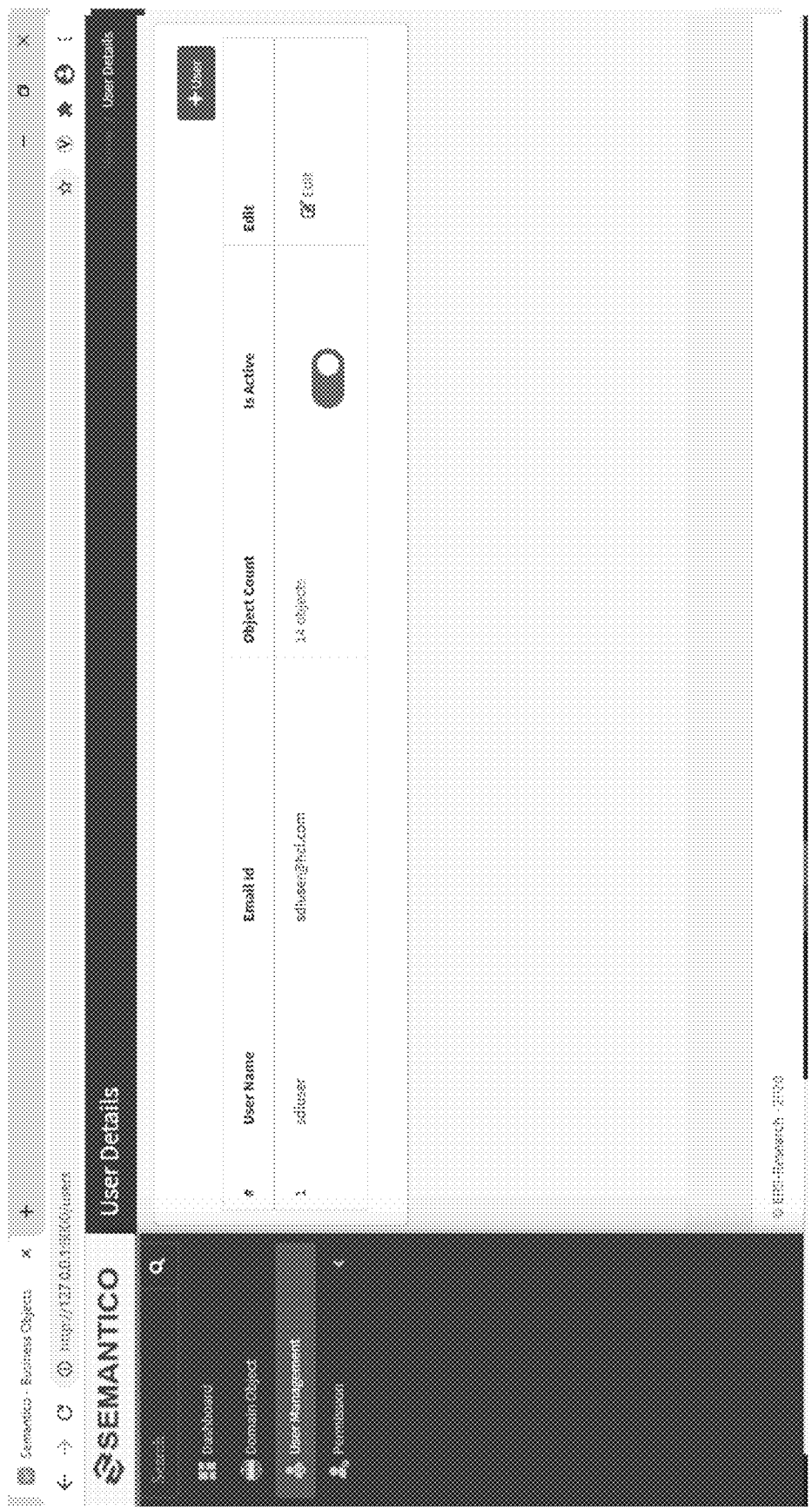
FIG. 8 illustrates an exemplary representation of a new user profile created via a semantic domain layer, in accordance with an exemplary embodiment.

Referring now to FIG. 8, an exemplary representation of a new user profile created via a semantic domain layer is depicted, in accordance with an exemplary embodiment. A UI 800 of a semantic domain layer depicts the new user profile created by an administrator. The new user profile may be associated with a new user. In reference to FIG. 1, the semantic domain layer may correspond to the semantic domain layer 102. In an embodiment, the administrator may correspond to a person that may have access of all functionalities of the semantic domain layer. The administrator may be the person that may be responsible to create the new user profile, create new domain object, provide access level and access permission to other user working in organization. Examples of the administrator may include but is not limited to, owner of organization, head of department, manager, etc.

In order to create the new user profile, the administrator may click on user management option from the set of options, present in left side of the menu. Once the user management option is selected, the UI 800 may open as depicted in present FIG. 8. The administrator may then click on '-Fuser button to create the new user profile. Once the administrator clicks on'-Fuser button, login credentials and information associated with the new user may be defined. The login credentials may include username and password. It should be noted that, the new user may change his password, once his user profile is created. In addition, the information associated with the new user may include his first name, last name, email ID, date of birth, etc. Thereafter, the administrator may assign at least one of the plurality of domain objects to the new users. As depicted in present FIG. 8, a set of fourteen domain object has been assigned to the new user. In reference to FIGS. 1 to 7, each of the set of fourteen domain objects may be assigned based on process disclosed in above figures. It should be noted that, the new user may access each of the set of fourteen domain objects assigned, by using his login credentials. Moreover, the "is active" icon displayed in the UI 800 may help the administrator to identify whether the new user created is active or not. In an embodiment, the administrator may see active state of each of the plurality of user under is active icon. Once the new user is created, the new user may edit his basic user profile details via an edit option displayed in the UI 800. Example of the basic user profile details may include login password, his name, email ID, etc.

Various embodiments provide method and system for providing profile-based data and visualization access through a semantic domain layer. The disclosed method and system may receive a user request to access data. Moreover, the disclosed method and system may determine a user profile from a plurality of user profiles associated with the user. The plurality of user profiles corresponds to a plurality of users. Further, the disclosed method and system may extract a first access level from a first set of access levels associated with the user profile. In addition, the disclosed method and system may map the user profile with a domain object from a plurality of domain objects, based on a second access level from the first set of access levels associated with the domain object. Thereafter, the disclosed method and system may selectively render at least a portion of the data requested in the user request to the user, in response to mapping the user profile with the domain object.

The system and method provide some advantages like, the system and the method may provide exposure and reuse of pre-created datasets across multiple tools having single source of truth of data access, thereby minimizing dependency of IT teams. Further, the disclosed method and system may enable dynamic application, control permissions, and user access based on user persona even without modifying query. In addition, the disclosed method and system may provide dynamic behavior to control rows and column level of data access based on user persona (GEO, roles, authorizations). Moreover, the disclosed method and system may define auto join and may detect relationship between data and user. Additionally, the disclosed method and the system may hide, mask and encrypt data based on user persona.

It will be appreciated that, for clarity purposes, the above description has described embodiments of the invention with reference to different functional units and processors. However, it will be apparent that any suitable distribution of functionality between different functional units, processors or at least may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for providing profile-based data and visualization access through a semantic domain layer, the method comprising:
    receiving, by the semantic domain layer, a user request to access data;
    determining, by the semantic domain layer, a user profile from a plurality of user profiles associated with the user, wherein the plurality of user profiles correspond to a plurality of users;
    extracting, by the semantic domain layer, a first access level from a first set of access levels associated with the user profile;
    mapping, by the semantic domain layer, the user profile with a domain object from a plurality of domain objects, based on a second access level from the first set of access levels associated with the domain object; and
    selectively rendering, by the semantic domain layer, at least a portion of the data requested in the user request to the user, in response to mapping the user profile with the domain object.

2. The method of claim 1, further comprising;
creating the domain object, wherein the domain object is communicatively coupled to the semantic domain layer; and
assigning the second access level of the first set of access levels to the domain object, wherein the first set of access levels comprises a public access level, a private access level, and a protected access level.

3. The method of claim 2, wherein creating the domain object comprises:
selecting at least one data-source for the domain object; and
identifying a set of tables from the at least one data-source to be associated with the domain object.

4. The method of claim 3, further comprising:
assigning one of the first set of access levels to each of a plurality of fields within the set of tables; and
assigning one a second set of access levels to at least one of the plurality of fields, wherein the second set of access levels comprises an encrypted access and a masked access, and wherein each of the plurality of fields corresponds to one of a row and a column within one of the set of tables.

5. The method of claim 4, further comprising creating an alias for at least one of the plurality of field to standardize data representation across the set of tables.

6. The method of claim 4, further comprising assigning one of the first set of access levels to each of the plurality of users, wherein one of the first set of access levels is assigned for each of the plurality of domain objects and associated one or more fields.

7. The method of claim 3, wherein identifying the set of tables from the at least one data-source comprises automatically creating at least one link between one or more of the set of tables based on associated fields from the plurality of fields.

8. The method of claim 1, further comprising creating the plurality of user profiles, wherein each of the plurality of user profiles is associated with at least one of a plurality of user attributes.

9. The method of claim 8, wherein the plurality of user attributes comprises at least one of employee Identifier (ID), organization ID, team ID, business unit ID, user location, or current designation.

10. The method of claim 1, wherein rendering comprises presenting at least the portion of the data in one of a predefined set of data visualization formats.

11. A system for providing profile-based data and visualization access through a semantic domain layer, the system comprising:
a processor; and
a memory communicatively coupled to the processor, wherein the memory stores processor executable instructions, which, on execution, causes the processor to:
receive a user request to access data;
determine a user profile from a plurality of user profiles associated with the user, wherein the plurality of user profiles correspond to a plurality of users;
extract a first access level from a first set of access levels associated with the user profile;
map the user profile with a domain object from a plurality of domain objects, based on a second access level from the first set of access levels associated with the domain object; and
selectively render at least a portion of the data requested in the user request to the user, in response to mapping the user profile with the domain object.

12. The system of claim 11, wherein the processor executable instructions further cause the processor to:
creating the domain object, wherein the domain object is communicatively coupled to the semantic domain layer; and
assigning the second access level of the first set of access levels to the domain object, wherein the first set of access levels comprises a public access level, a private access level, and a protected access level.

13. The system of claim 12, wherein the processor executable instructions cause the processor to creating the domain object by:
selecting at least one data-source for the domain object; and
identifying a set of tables from the at least one data-source to be associated with the domain object.

14. The system of claim 13, wherein the processor executable instructions further cause the processor to:
assign one of the first set of access levels to each of a plurality of fields within the set of tables; and
assign one a second set of access levels to at least one of the plurality of fields, wherein the second set of access levels comprises an encrypted access and a masked access, and wherein each of the plurality of fields corresponds to one of a row and a column within one of the set of tables.

15. The system of claim 14, wherein the processor executable instructions further cause the processor to create an alias for at least one of the plurality of field to standardize data representation across the set of tables.

16. The system of claim 14, wherein the processor executable instructions further cause the processor to assign one of the first set of access levels to each of the plurality of users, wherein one of the first set of access levels is assigned for each of the plurality of domain objects and associated one or more fields.

17. The system of claim 13, wherein the processor executable instructions cause the processor to identify the set of tables from the at least one data-source by automatically creating at least one link between one or more of the set of tables based on associated fields from the plurality of fields.

18. The system of claim 11, wherein the processor executable instructions further cause the processor to create the plurality of user profiles, wherein each of the plurality of user profiles is associated with at least one of a plurality of user attributes.

19. The system of claim 18, wherein the plurality of user attributes comprises at least one of employee Identifier (ID), organization ID, team ID, business unit ID, user location, or current designation.

20. The system of claim 11, wherein the processor executable instructions cause the processor to render by presenting at least the portion of the data in one of a predefined set of data visualization formats.

21. A non-transitory computer-readable medium storing computer-executable instructions for providing profile-based data and visualization access through a semantic domain layer, the stored instructions, when executed by a processor, cause the processor to perform operations comprising:
receiving a user request to access data;
determining a user profile from a plurality of user profiles associated with the user, wherein the plurality of user profiles correspond to a plurality of users;

extracting a first access level from a first set of access levels associated with the user profile;

mapping the user profile with a domain object from a plurality of domain objects, based on a second access level from the first set of access levels associated with the domain object; and selectively rendering at least a portion of the data requested in the user request to the user, in response to mapping the user profile with the domain object.

* * * * *